United States Patent [19]
Miyamoto et al.

[11] Patent Number: 5,130,742
[45] Date of Patent: Jul. 14, 1992

[54] CAMERA HAVING SELECTABLE WHITE BALANCE MODES

[75] Inventors: Ryosuke Miyamoto; Shinji Sakai, both of Kanagawa, Japan

[73] Assignee: Canon Kabushiki Kaisha, Tokyo, Japan

[21] Appl. No.: 729,858

[22] Filed: Jul. 11, 1991

Related U.S. Application Data

[63] Continuation of Ser. No. 432,345, Nov. 6, 1989, abandoned, which is a continuation of Ser. No. 300,708, Jan. 23, 1989, abandoned, which is a continuation of Ser. No. 51,052, May 15, 1987, abandoned.

[30] Foreign Application Priority Data

| May 20, 1986 | [JP] | Japan | 61-113468 |
| May 20, 1986 | [JP] | Japan | 61-113469 |
| May 20, 1986 | [JP] | Japan | 61-113470 |
| May 21, 1986 | [JP] | Japan | 61-114919 |

[51] Int. Cl.⁵ .................................................. G03B 7/06
[52] U.S. Cl. .................................... 354/475; 358/909
[58] Field of Search ............... 354/465, 471, 474, 475, 354/430, 289.1, 289.12, 472; 358/29, 29 C, 41, 909; 352/170–172

[56] References Cited

U.S. PATENT DOCUMENTS

| 4,081,813 | 3/1978 | Kawamura et al. | 354/289.1 |
| 4,114,995 | 9/1978 | Stieringer et al. | 352/171 |
| 4,483,601 | 11/1984 | Sekida et al. | 354/289.1 |
| 4,538,891 | 9/1985 | Matsuyama et al. | 354/289.1 |
| 4,590,512 | 5/1986 | Kondo | 358/29 C |
| 4,647,176 | 3/1987 | Shimizu et al. | 354/289.1 |

FOREIGN PATENT DOCUMENTS

4388 1/1986 Japan .................................. 358/29 C

Primary Examiner—W. B. Perkey
Attorney, Agent, or Firm—Robin, Blecker, Daley & Driscoll

[57] ABSTRACT

A camera for making an exposure based on a preset value of shutter time with common display elements for selectively presenting displays of a clock and the value of shutter time, in which the display elements normally display the clock, and, when presentation of the preset value of shutter time is indicated by an indicating member for indicating a release operation, the shutter time is displayed in the display elements.

43 Claims, 19 Drawing Sheets

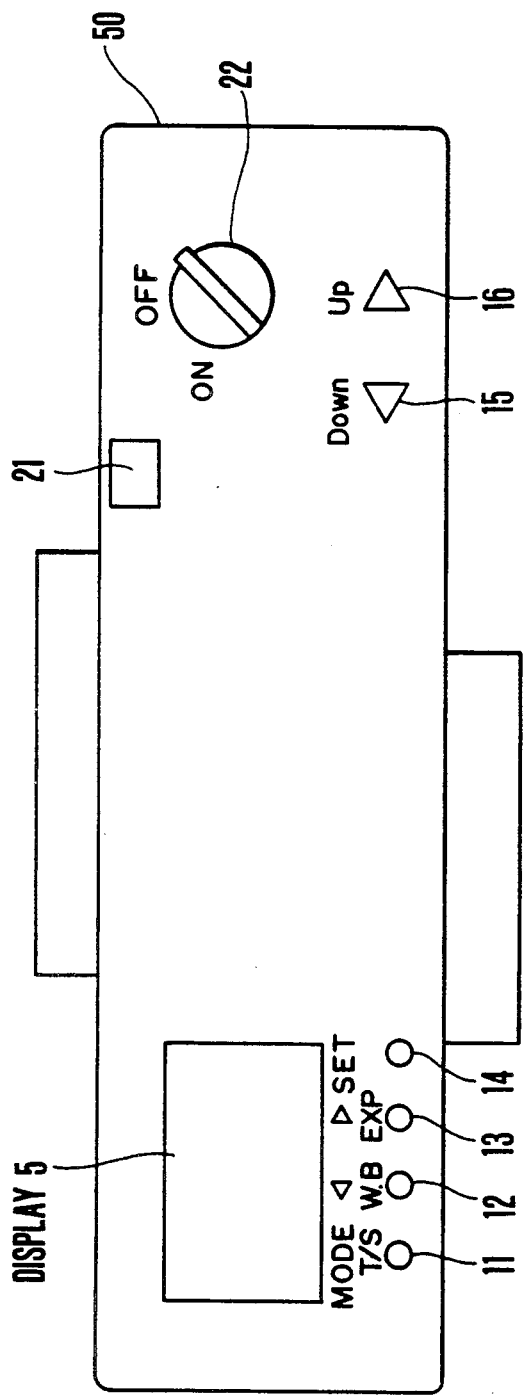

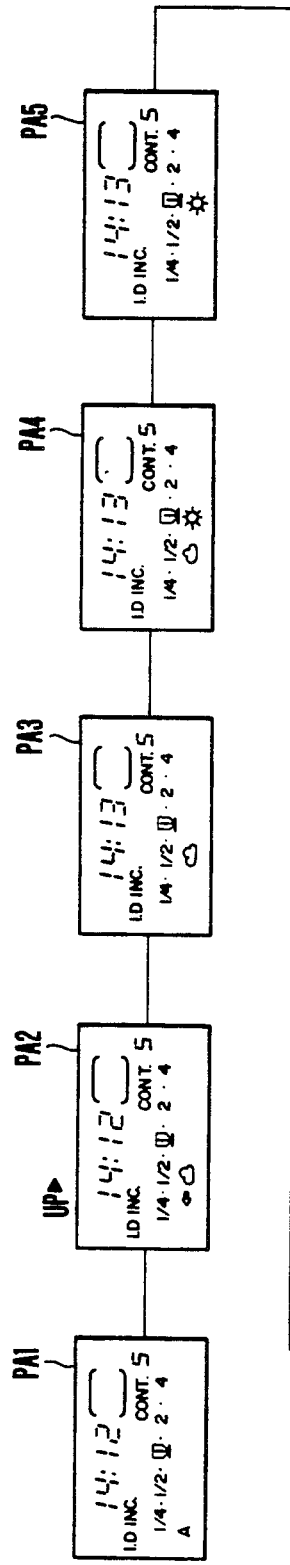
FIG.6
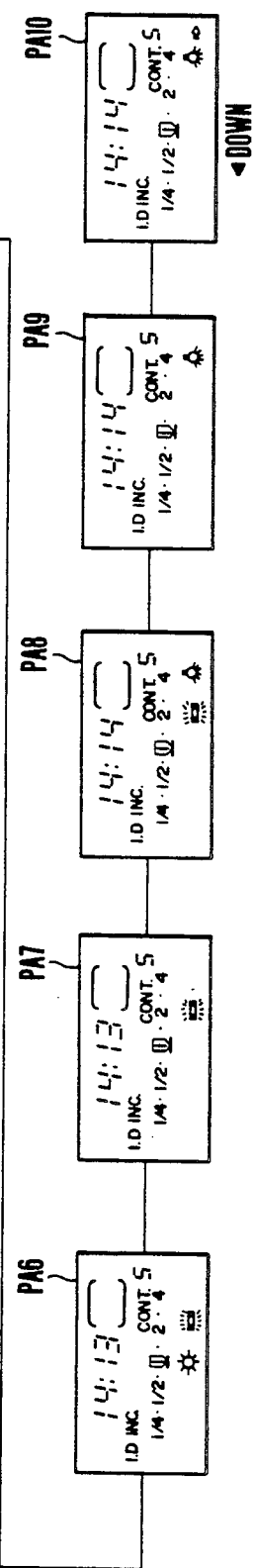
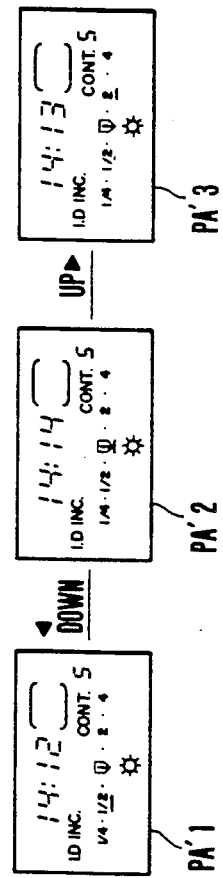
FIG.8

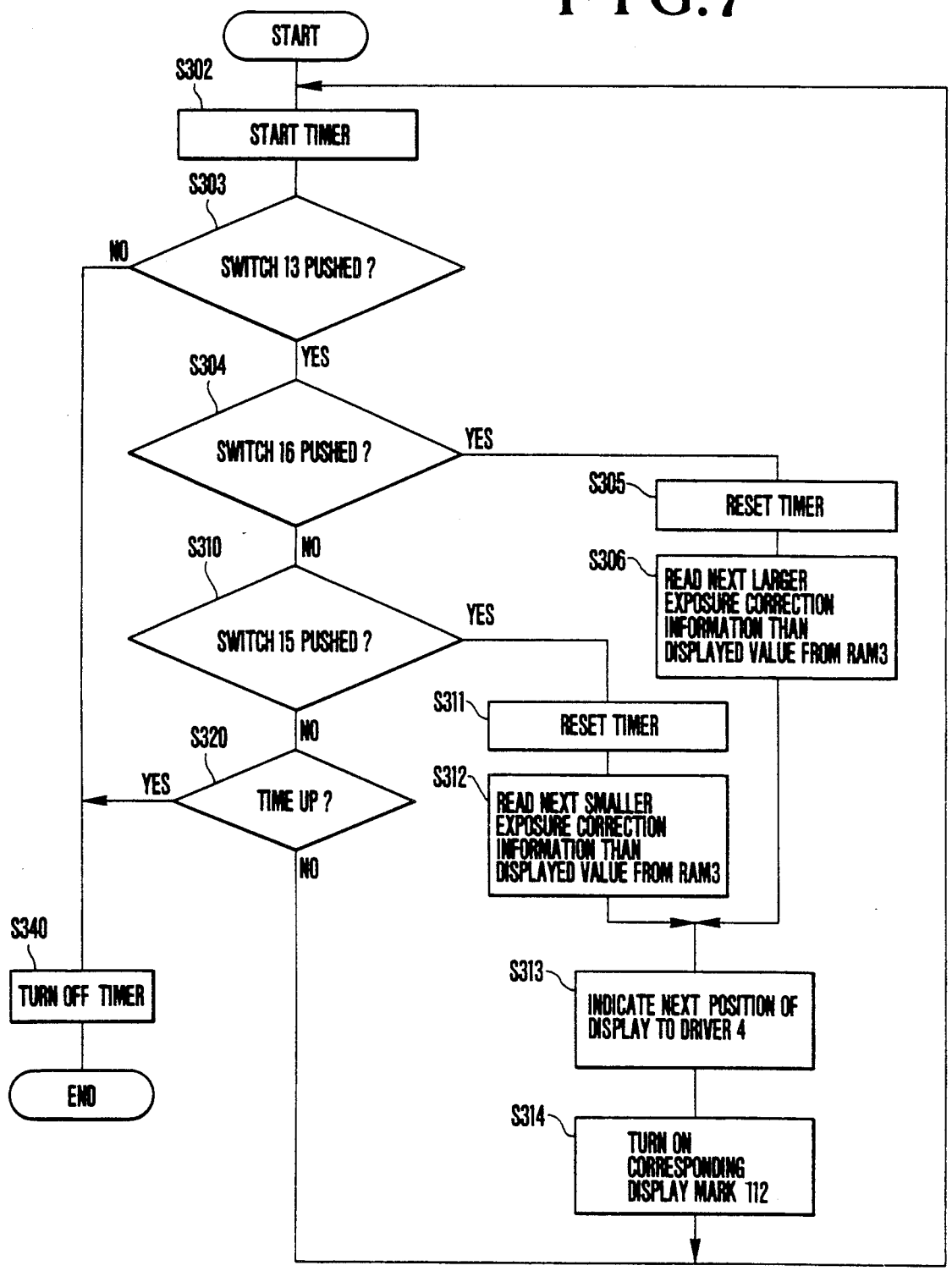

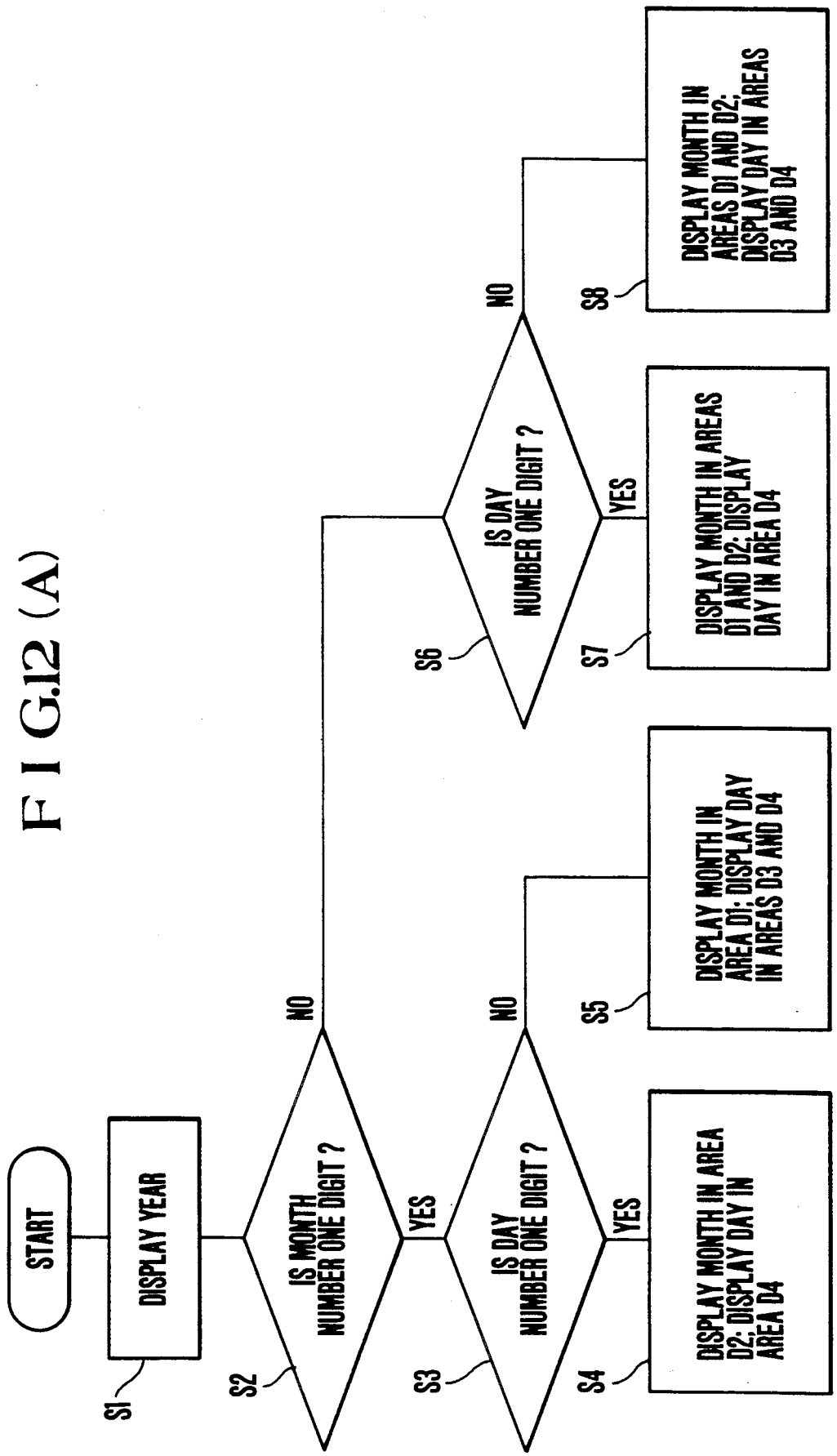
F I G.12 (A)

CAMERA HAVING SELECTABLE WHITE BALANCE MODES

This is a continuation application of prior application Ser. No. 432,345, filed Nov. 6, 1989, (now abandoned), which is a continuation of Ser. No. 300,708, filed on Jan. 23, 1989 (now abandoned), which is a continuation of Ser. No. 051,052, filed May 15, 1987, (now abandoned).

BACKGROUND OF THE INVENTION

1. Field of the Invention

This invention relates to cameras, and more particularly to cameras capable of displaying various kinds of photographic informations.

2. Description of the Related Art

In general, the use of the central processing unit in the electronic camera has been considered in combination with a liquid crystal display device for presenting camera informations such as the time, date, shutter speed, frame number and others.

As the number of kinds of informations increases, however, the display space of the display device and the necessary number of information input means are also increased. When, for example, the time (hour, minute, second), the date (year, month, day), and the film frame number were to be displayed, three input means for commanding the changes of the time, date and frame number and three altering means for altering these three kinds of informations were necessary. Within the limited space of the camera, therefore, a problem arose that the number of informations to be displayed was limited.

Also, particularly in the color movie or still video camera using a CCD or like image pickup element, it is generally necessary to adjust the white balance. Of the cameras with such white balance adjustment, there is, for example, one in which, the camera user turns a volume for adjusting the white balance and a number of white balance modes are selectively set depending on the amount of rotation of the volume. This volume is provided with a white balance scale and symbols, or letters to enable the camera user to know the amount of rotation of the volume. However, in the conventional camera of this kind, the calibrations and symbols are cut in the surface of the volume, and the cutouts are filled with paint or the like. Therefore, there ha been a problem that, as the camera either has long been used, or is being used in bad atmospheres, the paint layer is peeled off so that the scale and the symbols become difficult to read.

Also, to increase the accuracy of adjustment of the white balance, the number of white balance modes to be set is necessarily increased. Therefore, there has been another problem in that the number of mode marks to be displayed is also so much increased that the mode marks cannot all be displayed.

SUMMARY OF THE INVENTION

An object of the present invention is to provide a camera which can eliminate partly or totally such problems.

Another object of the present invention is to provide a camera in which various kinds of photographic informations are displayed efficiently or for better reading.

Under such an object, according to a preferred embodiment of the invention as applied to the camera in which the exposure is made based on a predetermined shutter time, a camera is disclosed wherein the clock display and the shutter time display are selectively presented by the same display elements in such a manner that the display elements usually display a time, and, when a command for displaying the set value of shutter time is given by an indicating member for indicating a release operation, the display elements change their operation to display the shutter speed.

Still another object of the present invention is to provide a camera in which the various photographic informations are efficiently displayed by arranging the same display elements so as to perform either of the display of the informations in a plurality of digits, for example, shutter speed, and the display of a calendar.

A further object of the present invention is to provide a display device in which the display of the information such as shutter speed in a plurality of digits and the display of a calendar are performed by the same display elements in a way easy to read.

Under such an object, according to a preferred embodiment of the invention as applied to the multi-functional display device for displaying a plurality of kinds of informations including the month information and the day information, a display device is disclosed that has means for examining whether the number of digits of the first information to be displayed on the left side is one or two, and means for examining whether the number of digits of the second information to be displayed on the right side is one or two, wherein if either one of the second information to be displayed on the right side and the first information to be displayed on the left side is one digit, a blank place is provided between the first and second informations so that the first information and the second information are not confused with each other.

A further object of the present invention is to provide a camera in which the various photographic informations are efficiently displayed and settable.

Another object of the present invention is to provide a camera in which many kinds of informations can be inputted to be displayed by a reduced number of input means.

Under such an object, according to a preferred embodiment of the invention, a camera is disclosed that has first input means capable of alternately performing the command of allowing a plurality of camera information setting modes to be altered and the release of that command, second input means having a first state in which when the allowance of altering the plurality of camera information setting modes is commanded by the first input means, one of the digits of the information to be set is selected in the selected one of the plurality of camera information setting modes, and a second state in which when the release of the command is being carried out by the first input means, an information setting mode other than the plurality of camera information setting modes is selected, and display means for displaying the first or second state selected by the input means.

Yet another object of the present invention is to provide a camera capable of altering the setting of modes of the white balance very easily and without mistake for assurance.

A further object of the present invention is to provide a camera capable of displaying the modes of the white balance to be set in a way easy to read.

To achieve such an object, according to a preferred embodiment of the present invention, a camera is disclosed that is provided with first means for commanding alteration of the set mode of the white balance, second means for altering the modes of the white balance to be set in a prescribed order when the alteration of the set mode of the white balance is being commanded by the first means, and display means for displaying the altered and set mode of the white balance, so that under the command of the first means the white balance is altered in the prescribed order, and a corresponding pattern to the set white balance is displayed, thus making it possible that a great number of modes of the white balance are selectively set easily and quickly.

These and other objects and features of the present invention will become apparent from the following description of embodiments thereof.

BRIEF DESCRIPTION OF THE DRAWINGS

FIG. 2 is an elevational view illustrating an example of the outer appearance in the embodiment of the invention.

FIG. 6 is a sequence of plan views of displays of different white balance modes in the embodiment of the invention.

FIG. 7 is a flowchart illustrating an example of a program for setting an exposure correction factor in the embodiment of the invention.

FIG. 8 is a sequence of plan views of displays of different values of the exposure correction factor.

FIG. 11 is a diagram illustrating what is improved in the embodiment shown in FIGS. 1 to 10.

DETAILED DESCRIPTION OF THE PREFERRED EMBODIMENTS

Figure 4:
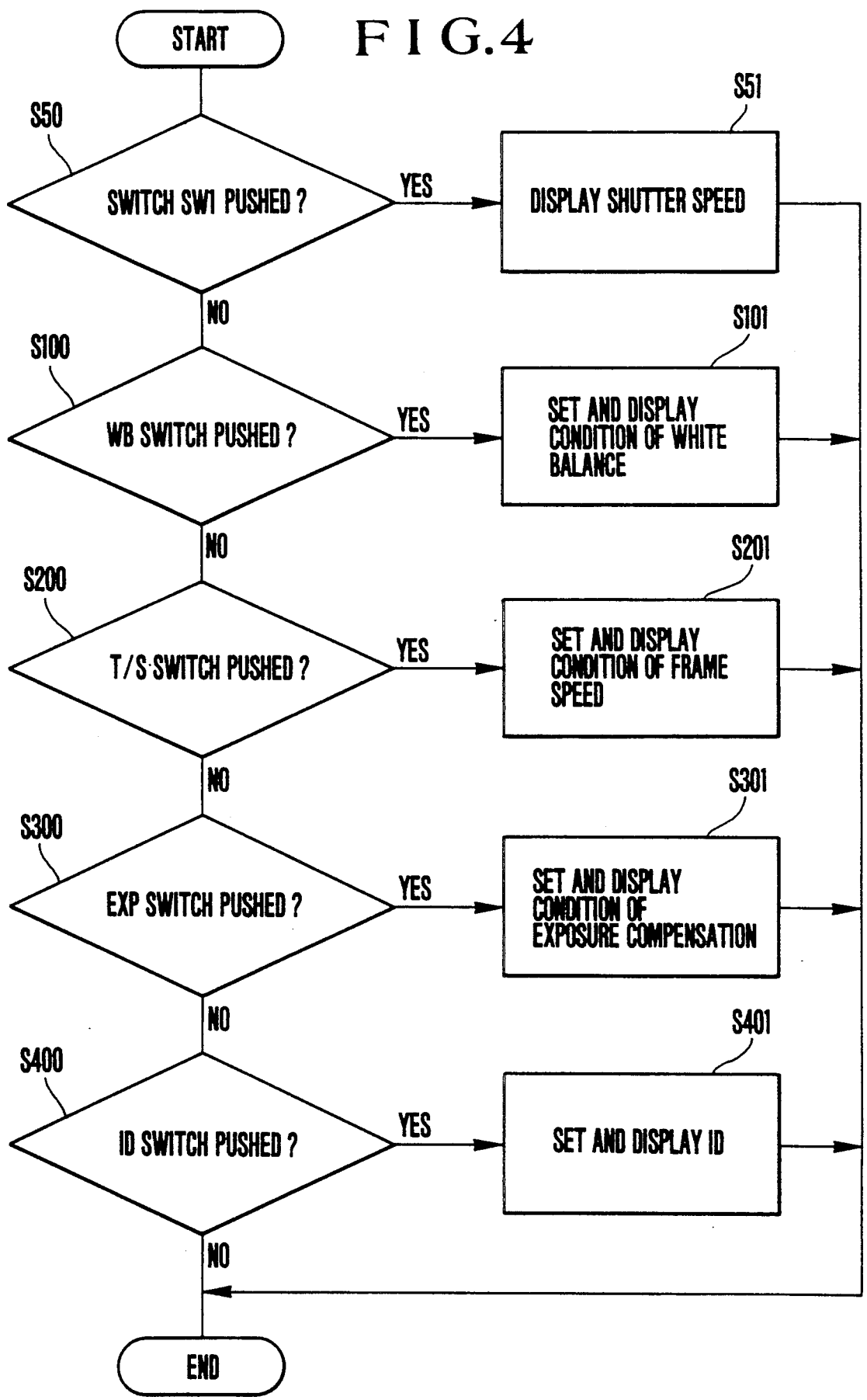
FIG. 4 is a flowchart illustrating an example of a program for the main control of the embodiment of the invention.

A central processing unit (CPU) 1 for executing the instruction of the program in sequence shown in FIG. 4 causes the various informations set by a framing speed selection switch (T/S switch) 11, a white balance selection switch (WB switch) 12, an exposure compensation selection switch (EXP-comp switch) 13 and a switch 14 to be displayed by an LCD display device 5. The switch 14 as the first input means can alternately carry out the command of allowing a plurality of ID information setting modes to be altered and the release of that command. For note, when the display is set in the ID display state, the T/S switch 11 changes the display of the frame number display mode, time display mode, date display mode and others. Also, in the ID display state, the WB switch 12 shifts the digit position to be set of the digital information to be set in the up order, and the EXP-comp switch 13 shifts the digit position of the digital information to be set in the down order. Thus, the WB and EXP switches constitute the second input means.

Further, 1A is a quartz oscillator; and 1B is an electrical power source.

A read only memory (ROM) 2 stores the program for the control shown in FIG. 4 and those that follow. A random access memory (RAM) 3 stores the preset values of the variables to be used in the program for the control shown in FIG. 4 and in all the modes.

An LCD driver 4 converts the display informations and input states being sent from the CPU 1 to drive signals for an LCD display device 5. The LCD display device 5 performs display on the basis of the drive signals from the LCD driver 4.

A main CPU 6 controls a frame advancing mechanism 7, a white balance adjusting mechanism 8 and an exposure correcting mechanism 9 in the set modes selected by the switches 11-13 respectively. A light metering circuit A receptive of the output of a photosensitive element B produces an output based on which the main CPU 6 computes a shutter time.

The frame advancing mechanism 7 moves a recording medium or a recording head at a preset frame speed. The white balance adjusting mechanism 8 processes the video signals in a preset white balance mode. The exposure correcting mechanism 9 corrects the exposure by a preset value of the correction factor.

A set switch 15 (DOWN switch) changes the condition to be set of the selected mode by the selection switches 11-14 in the down order. Another set switch 16 (UP switch) changes the condition to beset in up order. A release button 21 for taking a shot or shots has a switch SW1 for causing an object to be photographed to be light-metered, a shutter speed to be computed based on the light-metered data, and the computed shutter speed to be displayed on the display device 5 and another switch SW2 for commanding an execution of making an exposure for the object. The release 21 and the switches SW1 and SW2 constitute a 2-stage switch so that the switches SW1 and SW2 operate in sequence depending on the distance of depression of the release 21.

22 is a power switch of an electrical power source (not shown) for driving a camera body 50 of this embodiment. The depression of the switches of the release 21 during the time when the power switch 22 is off is not accepted.

FIG. 2 schematically illustrates the outer appearance of the embodiment of the invention.

Figure 1:
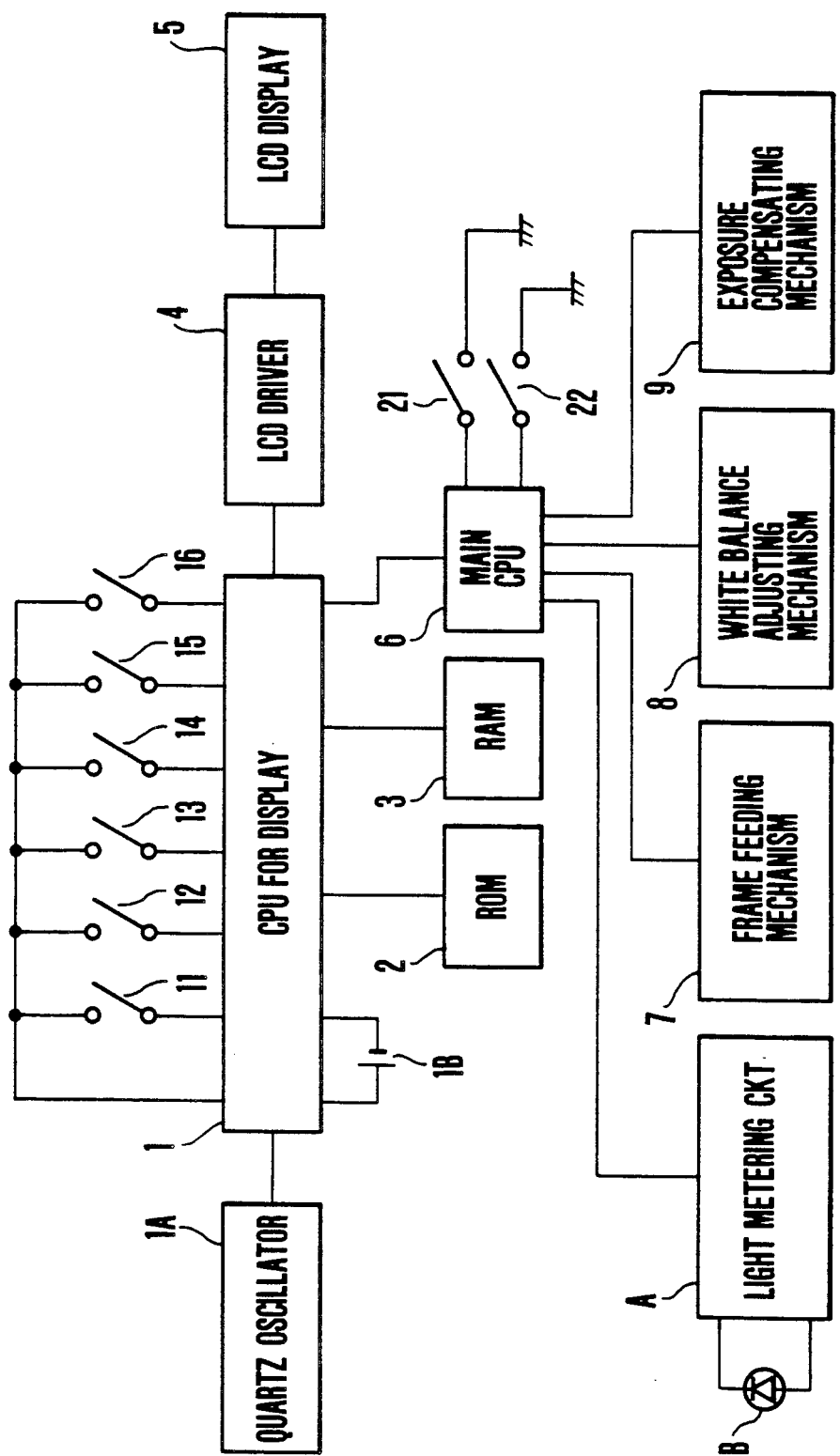
FIG. 1 is a block diagram illustrating the circuit structure in an embodiment of the invention.
Figure 3A:
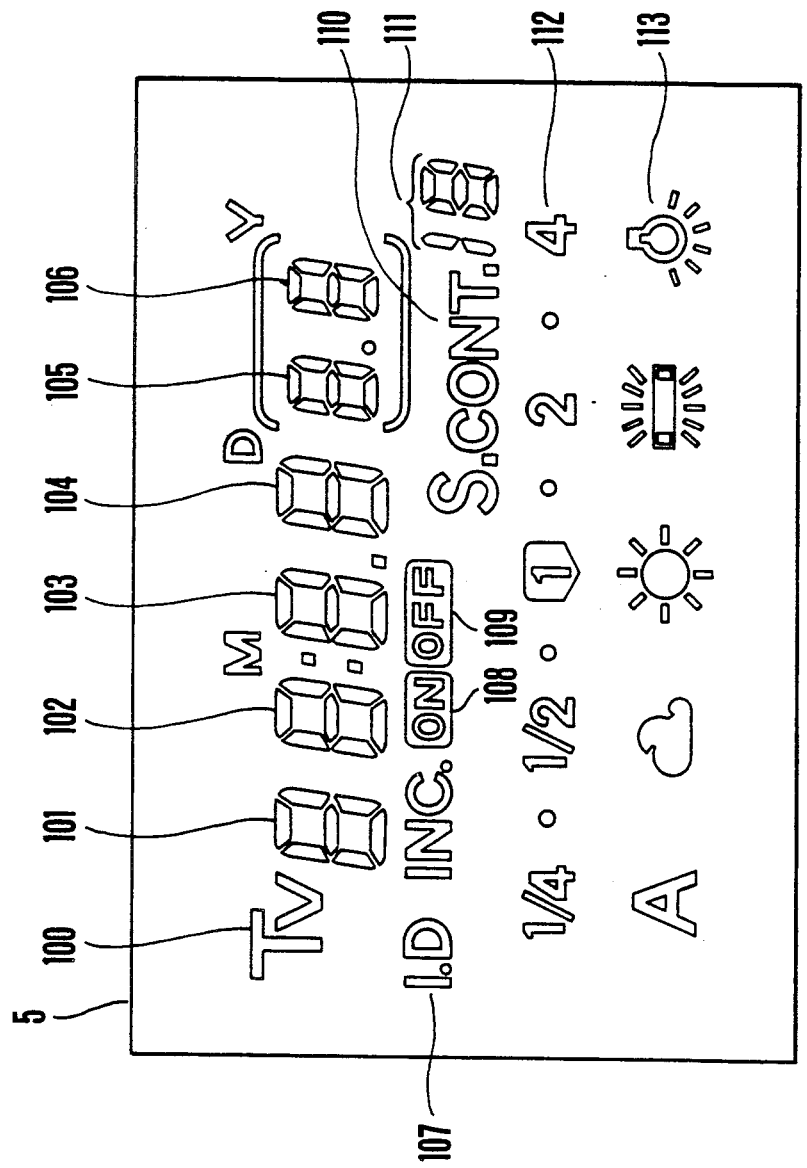
FIGS. 3(A) and 3(B) are plan views illustrating an example of display arrangement of the display device of FIG. 2.

In FIG. 2, the similar parts to those of FIG. 1 are denoted by the same reference numerals. 50 is a camera body. FIG. 3(A) illustrates an example of the display arrangement of the display device 5 shown in FIG. 2.

A Tv lamp 100 emits light when the display device 5 is set in the shutter speed display mode (Tv). Segments 101-104 of liquid crystal display a set value of shutter speed. As the display mode is changed, the segments 101-104 display hour-minute, month-day and the total number of exposed frame also. Segments 105-106 of liquid crystal display a year, second and frame number.

107 is an ID INC. display mark illustrating an automatically renewed state of the frame number in the ID display mode. The lighting of the ID INC display mark 107 and an ON display mark lamp 108 shows that when an exposure is made, the total number of exposed frames will be automatically renewed. The lighting of the ID INC display mark 107 and an OFF mark 109 shows that the total number of exposed frames is stopped from being renewed.

A lamp 110 is to display the framing speed setting mode. Liquid crystal segments 111 are to display a set value of the framing speed.

Exposure marks 112 are to display a set value of the exposure correction factor, and WB marks 113 are to photographically display a set step of white balance.

For note, when the power switch 22 of the camera is on, the display device 5 always presents the displays of a time (hour, minute), a frame number, the set state (ON, OFF display) of the ID NO. (the total number of exposed frames), the exposure corrected state, the set value of the framing speed, and the set white balance state.

FIG. 3(B) illustrates an example of display in the embodiment of the invention.

In FIG. 3(B), the display segments 100-104 display that the shutter speed is 1/2000 sec., and the display segments 105-106 display that the number of frames left to expose is 10. Also, the display segment 107 displays "ID INC ON" representing that the frame number will be automatically renewed. The display segments 110-111 display that the framing speed is 10 frames/sec. The display segment 112 for the exposure correction displays +1.5 step. Further, the display segment 113 displays that the white balance is set to clear weather.

FIG. 4 illustrates an example of a main control process in the embodiment of the invention. In FIG. 4, in the display device 5, the display of the time is being presented. Then, when either the switches 11-14 for setting the photographic mode or the switch SW1 for causing the shutter speed to be displayed is pushed down, an interrupting is carried out and the execution of the program for the control process shown in FIG. 4 is started.

If, in a step S50, the pushed-down switch is the switch SW1, then advance is to a step S51 in which the shutter speed information computed by the main CPU 6 on the basis of the light value information produced from the light metering circuit A is received from the main CPU 6 to be displayed by the LCD display device 5. For note, when the treatment of the step S51 ends, the control process of the embodiment of the invention is terminated. For note, when the switch SW1 is being ON, the shutter speed remains displayed. When the switch SW1 has turned off, the display device 5 returns to the usual display of the time.

If the pushed-down switch is not the switch SW1, then advance is to a step S100.

In the step S100, whether or not the pushed-down switch is the WB switch 12 is tested. If the pushed-down switch is the WB switch 12, then advance is to a step S101 in which setting of a condition of the white balance is carried out, and the set condition is displayed. Then, this control process is terminated and the interrupting is released. If the pushed-down switch is not the WB switch 12, then advance is to a step S200.

In the step S200, whether or not the pushed-down switch is the T/S switch 11 is tested. If the pushed-down switch is the T/S switch 11, then advance is to a step S201 in which a condition of the framing speed is set and the set condition is displayed, terminating this control process and releasing the interrupting. If the pushed-down switch is not the T/S switch 11, then advance to a step S300.

In the step S300, whether or not the pushed-down switch is the EXP-comp switch 13 is tested. If the pushed-down switch is the EXP-comp switch 13, then advance to a step S301 in which a condition of the exposure correction is set and the set condition is displayed, terminating this process and releasing the interrupting. If the pushed-down switch is not the EXP-comp switch 13, then advance is to a step S400.

In the step S400, whether or not the pushed-down switch is the ID switch 14 is tested. If the pushed-down switch is the ID switch 14, then advance is to a step S401 in which setting and displaying of ID is carried out, terminating this control process and releasing the interrupting.

If the pushed-down switch is not the ID switch 14, then this control process is terminated and the interrupting is released.

Figure 5:
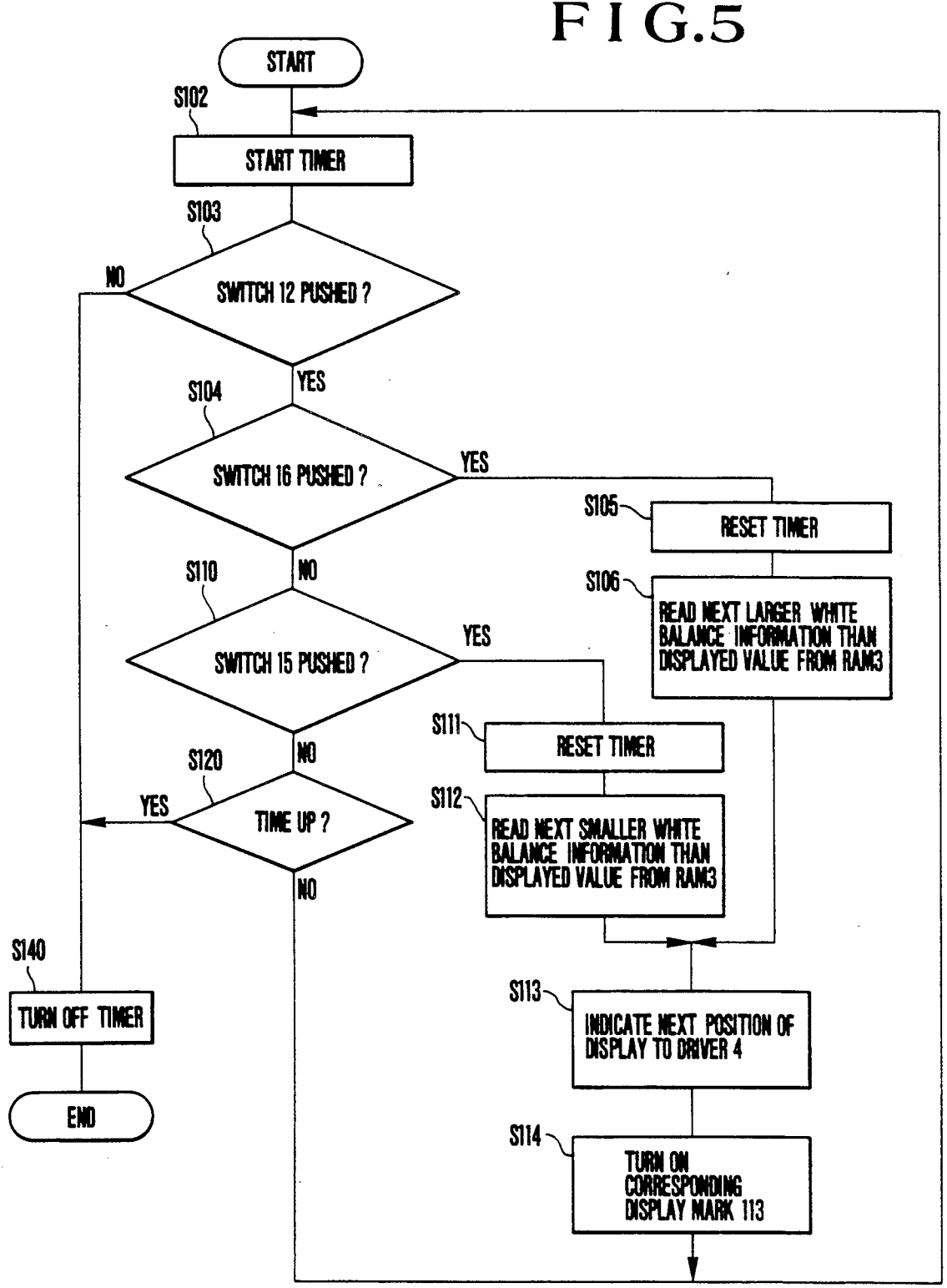
FIG. 5 is a flowchart for an example of a program for setting a white balance in the embodiment of the invention.

FIG. 5 illustrates an example of the process for setting and displaying the white balance in the step S101 shown in FIG. 4.

In FIG. 5, in a step S102, a timer which turns off in a prescribed time, for example, 2 minutes, is started. This timer may be operated with a clock signal from the quartz oscillator 1A to measure the prescribed time.

In a step S103, whether or not the WB switch 12 is in the pushed-down state is tested. If the WB switch 12 is not being pushed down, then the timer is turned off (step S140), terminating this control process.

If, in the step S103, the WB switch is in the pushed state, it is in a step S104 to test whether or not the WB switch 12 and the UP switch 16 are simultaneously pushed down. If the simultaneous depression of the WB switch 12 and the UP switch 16 is occurring, the timer is reset (step S105), a one-step larger white balance condition in value than the displayed white balance condition value in the display device 5 is read out from the RAM 3, and the white balance information for this white balance condition value to be set is sent to the main CPU 6 (step S106). For note, the main CPU 6 when making an exposure controls the white balance adjusting mechanism 8 in accordance with this white balance information, before an advance to a step S113 occurs.

If, in the step S104, the WB switch 12 and the UP switch 16 are not simultaneously pushed down, then advance is to a step S110.

In the step S110, whether or not the WB switch 12 and the DOWN switch 15 are simultaneously being pushed down is tested. If the simultaneous pushing down of the WB switch 12 and the DOWN switch 15 is occurring, then advance is to a step S111 to reset the timer. In a step S112, a one-step smaller white balance condition value than the displayed white balance condition value in the display device 5 is read out from the RAM 3, and this condition value is sent to the main CPU 6.

In the next step S113, a corresponding display information for the display device 5 to the readout white balance condition value is sent to the driver 4. The drive 4 converts this information to a liquid crystal display signal for the display device 5, causing the corresponding one of the pictographs to the set value of the white balance (step S114). Then return is to the step S102.

FIG. 6 illustrates a process for setting the white balance modes on the display. The white balance is displayed in the form of patterns in the lower margin of the display.

In FIG. 6, PA1 is a format surface when the white balance is set to the automatic adjustment. A pattern z637 A" is displayed. When the camera user, while pushing down the WB switch 12, pushes down the UP switch 16, a change to a format display PA2 occurs and a pattern display of a prescribed white balance dependent on the illuminating condition is presented. Then, each time the UP switch 16 is pushed down with the WB switch 12 in the pushed-down state, the pattern display changes from the format PA2 to PA10 successively. To set the white balance, the pushing-down of the WB switch 12 is interrupted in the stage of displaying the desired pattern display and thereby the white balance is set to the corresponding white balance to the pattern of the format PA.

By repeating the above-described procedure, the camera user while looking at the display format of the display device 5 can set a desired white balance.

FIG. 7 illustrates an example of the process for setting and displaying the exposure correction in the step S301 shown in FIG. 4.

In FIG. 7, in a step S302, a timer which turns off when a prescribed time, for example, 2 minutes has elapsed is started.

In a step S303, whether or not the EXP-comp switch 13 is in the pushed-down state is tested. If the EXP-comp switch 13 is not pushed down, the timer is turned off (step S340), terminating this control process. If, in the step S303, the EXP-comp switch 13 is in the pushed-down state, it is in a step S304 to test whether or not the EXP-comp switch 13 and the UP switch 16 are simultaneously pushed down. If the simultaneous pushing down of the EXP-comp switch 13 and the UP switch 16 is occurring, the timer is reset (step S305) and a one-step larger exposure compensation condition value than the displayed exposure compensation condition value in the display device 5 is read out from the RAM 3, and the exposure compensation information for this exposure compensation condition value to be set is sent to the main CPU 6 (step S306). For note, the main CPU 6 when making an exposure control the exposure compensation adjusting mechanism 9 on the basis of this exposure compensation information, before an advance to a step S313 occurs.

If, in the step S304, the EXP-comp switch 13 and the UP switch 16 are not simultaneously pushed down, then advance is to a step S310.

In the step S310, whether or not the EXP-comp switch 13 and the DOWN switch 15 are simultaneously pushed down is tested. If the simultaneous pushing down of the EXP-comp switch 13 and the DOWN switch 15 is occurring, then reset the timer is reset. In a step S312, a one-step smaller exposure compensation condition value than the displayed exposure compensation condition value in the display device 5 is read out from the RAM 3. This condition value is sent to the main CPU 6.

In the next step S313, a corresponding display information for the display device 5 to the readout exposure compensation condition value is sent to the driver 4. The driver 4 converts this information to a liquid crystal display signal for the display device 5, and a cursor is displayed in a corresponding position to the set exposure compensation value in the display device 5 (Step S314). Then return is to the step S302.

FIG. 8 illustrates a process for setting the exposure compensation mode on the display in the embodiment of the invention. The inputted mode is displayed by the cursor below the scale of exposure compensation values.

In FIG. 8, when the camera user while pushing down the EXP-comp switch 13, pushes down the UP switch 16, a change to a format display PA'2 occurs. For example, the cursor comes under the display of "1" in the exposure compensation value. Thus, the exposure compensation value depending on the illuminating condition is displayed in the form of a pattern. Then, each time the UP switch 16 is pushed down with the EXP-comp switch 13 in the pushed-down state, the exposure correction value display changes successively. To set the exposure compensation, the pushing-down of the EXP-comp switch 13 is interrupted in the stage of displaying the desired exposure compensation value. After a prescribed time has elapsed, the corresponding exposure compensation value to the display is then set in.

Next, to alter the exposure compensation value set in, for example, the format PA'3 to an exposure compensation value of, for example, the format PA'1, as the display changes successively each time the DOWN switch 15 is pushed down while the EXP-comp switch 13 being pushed down, the pushing down of the EXP-comp switch 13 and the DOWN switch 15 is interrupted at the time of appearance of the format PA'1 and thereby the exposure compensation is set to the corresponding value to the cursor display of the format PA'1.

By repeating the above-described procedure, the camera user while looking at the presented format of the display device 5 can set a desired value of the exposure compensation.

FIGS. 9(A)-9(G) illustrate a process for setting and displaying ID in the step S401 shown in FIG. 4.

Figure 9:
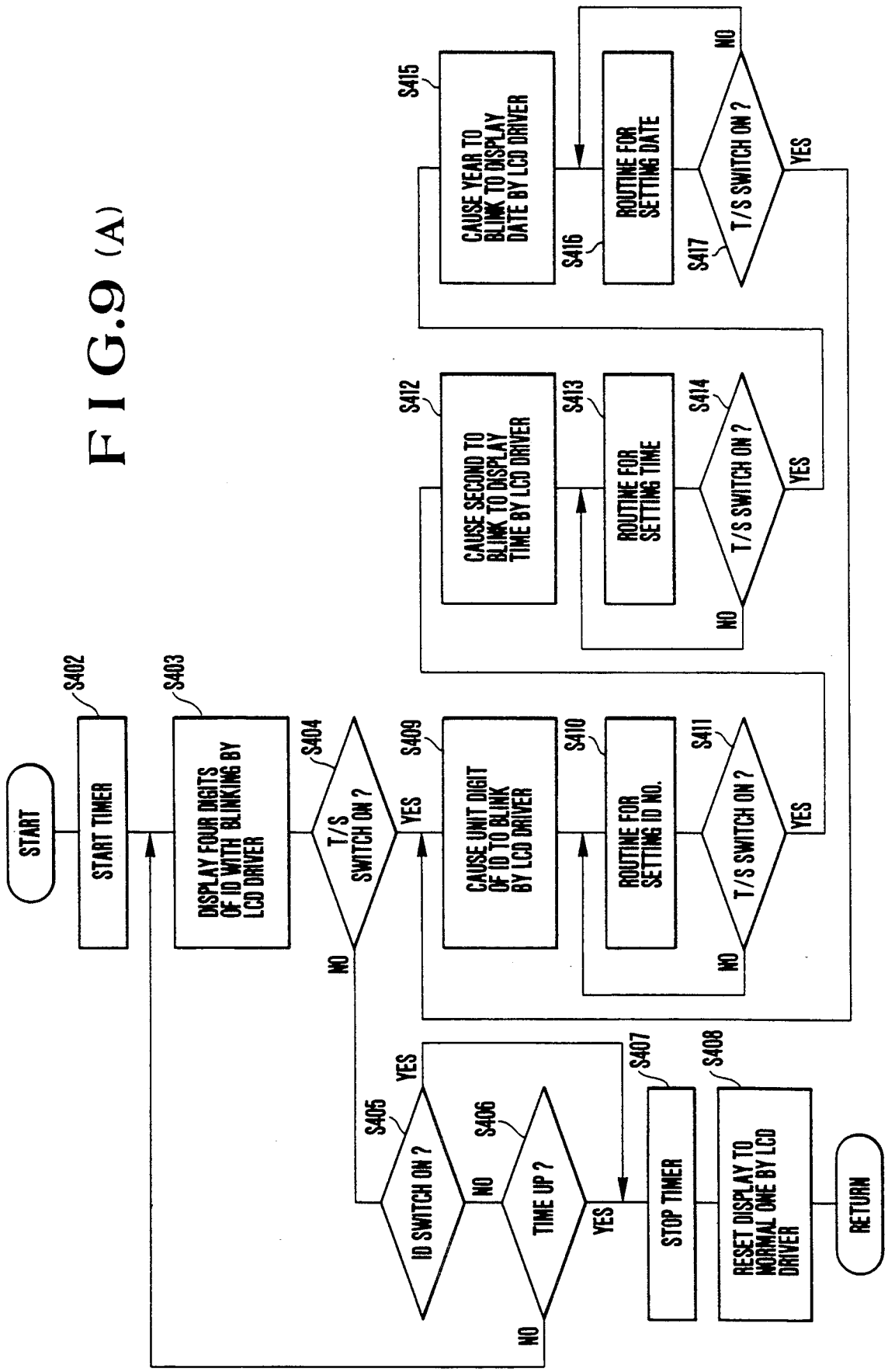
FIGS. 9(a)-9(G) are flowcharts illustrating an example of a program for setting ID in the embodiment of the invention.

In FIG. 9(A), in a step S402, a timer which turns off after a prescribed time, for example, 2 minutes has elapsed is started. In a step S403, in order to demand the camera user to select modes in the ID information, the LCD driver 4 is commanded to blink the displayed 4-place figure by the liquid crystal segments 101-104 shown in FIG. 3(A).

For note, a changeover switch for the display of the ID informations is common to the T/S switch 11 for selecting the values of the frame speed.

In a step S404, whether or not the camera user has pushed down the T/S switch 11 is tested. If not, this implies that either an erroneous inputting is operated, or the setting is terminated. So, which of both is true is tested in a step S405.

In the step S405, whether or not the camera user once more pushes down the ID switch 14 is tested. If the switch 14 has been pushed down, the setting terminates. Then advance is to a step S407. If the ID switch 14 is not pushed down, the operation is faulty. Then test is made as to whether or not the timer has timed out (Step S406).

If the time is not up yet, the return is to the step S403 to do over again the mode setting input from the beginning. When the time has expired, the timer is stopped in a step S407. In a step S408, the display segments 101-104 of the display device 5 are made to display the time, terminating this control process, and releasing the interrupting.

If, in the step S404, the T/S switch 11 is being pushed down, the display segment 104 is caused to blink in a step S409. Then advance is to a step S410. In the step S410, a process for setting a total number of exposed frames shown in FIG. 9(B) operates. If the operation of inputting the total number of exposed frames is not performed, then advance to a step S411, and also test whether or not the T/S switch 11 has been pushed down. If not, then return to the step S410, and wait for the next input.

When the T/S switch 11 is pushed down, an advance to a step S412 occurs so that the display segments 101–106 change its operation to display the time, causing the display segments for second to blink. Next, in a step S413, a process for setting a time shown in FIG. 9(D) is carried out. But, if the operation of inputting a time information is not performed, then advance is to a step S414 to test whether or not the T/S switch 11 has been pushed down. If not, then return is to the step S413 and wait for an input. When the T/S switch 11 is pushed down, an advance to a step S415 occurs L1 so that the segments 101–106 change its mode of operation to display a date, causing the display segments 105 and 106 for year to blink.

Figure 9B:
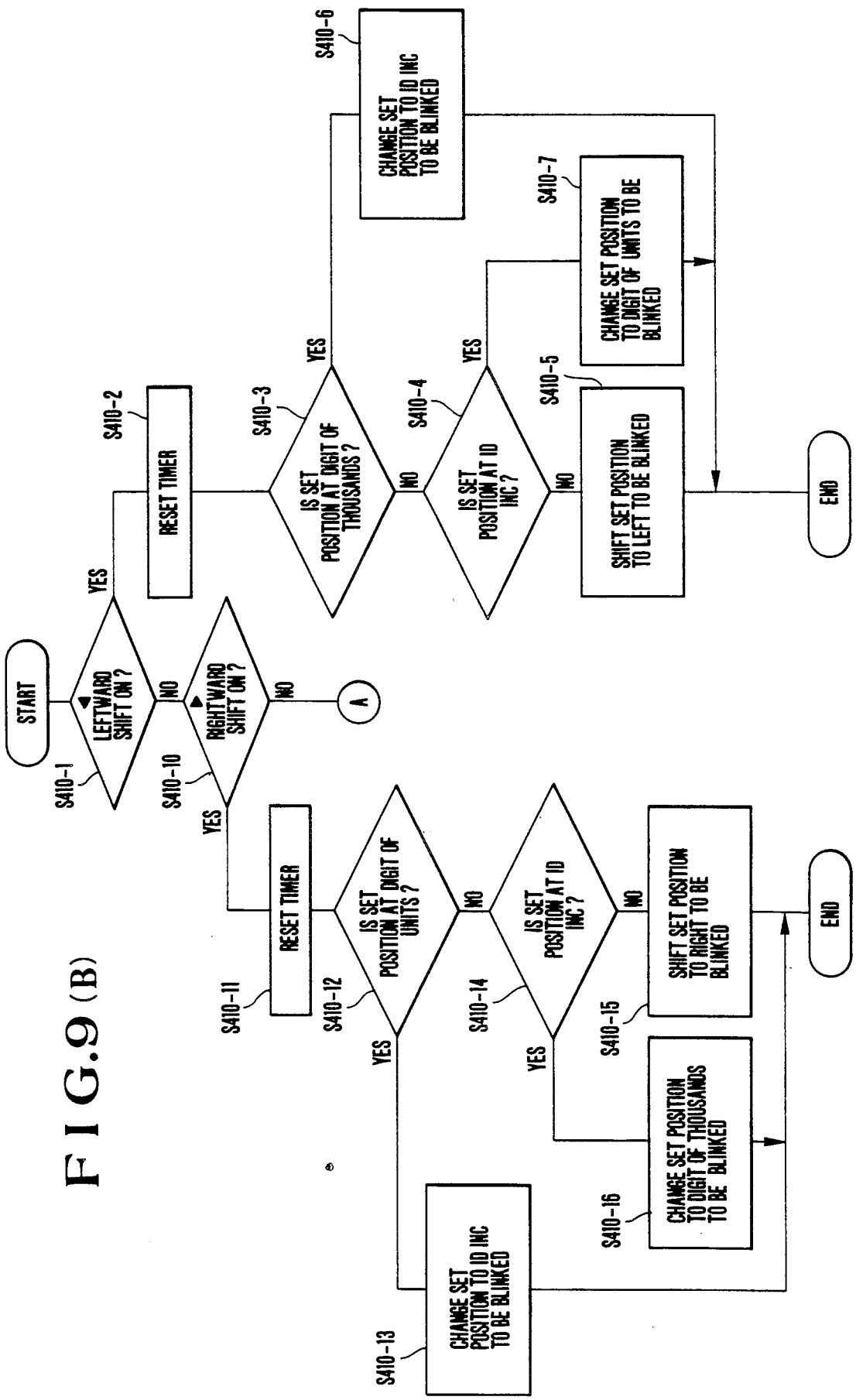
Figure 9C:
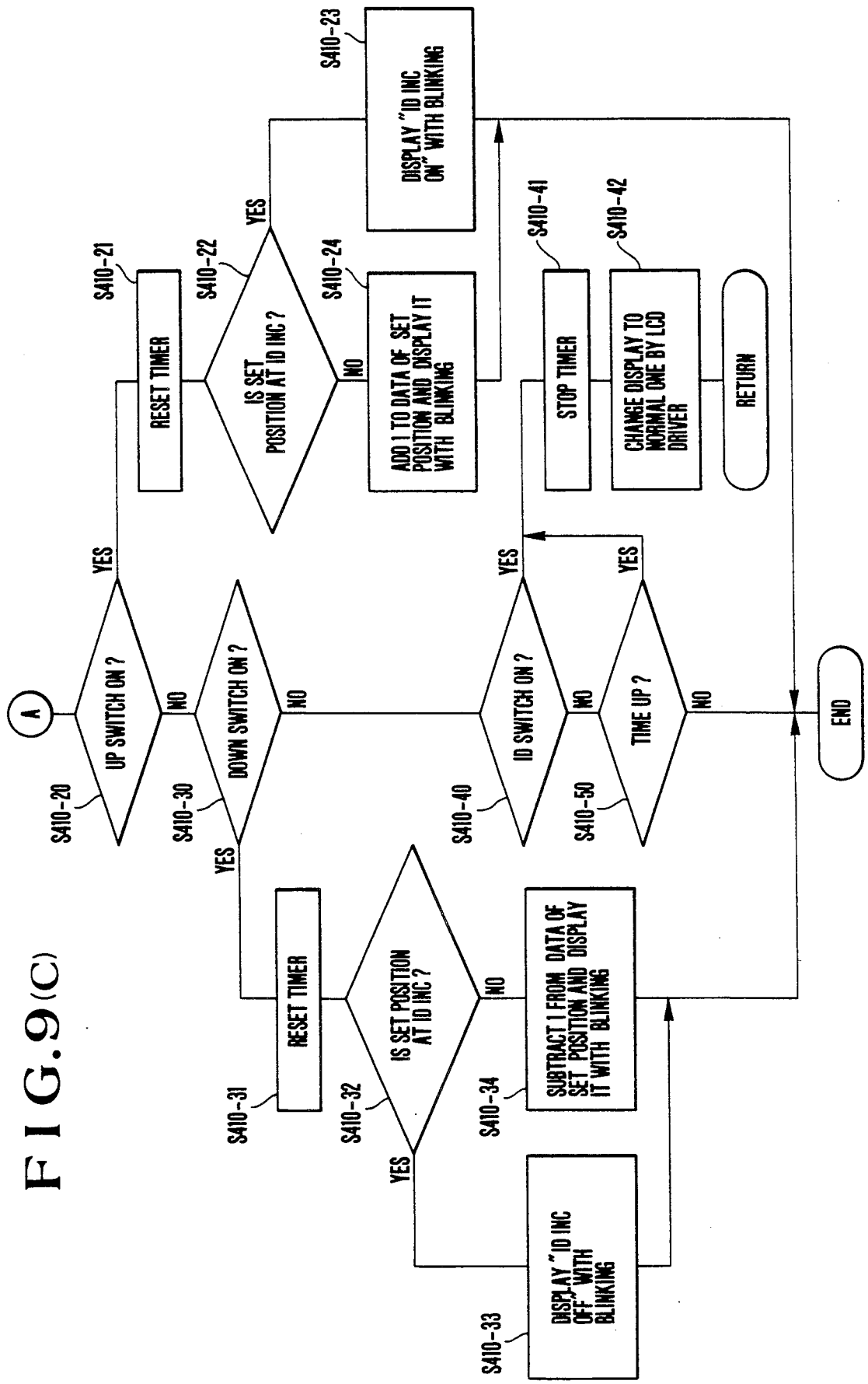
Figure 9D:
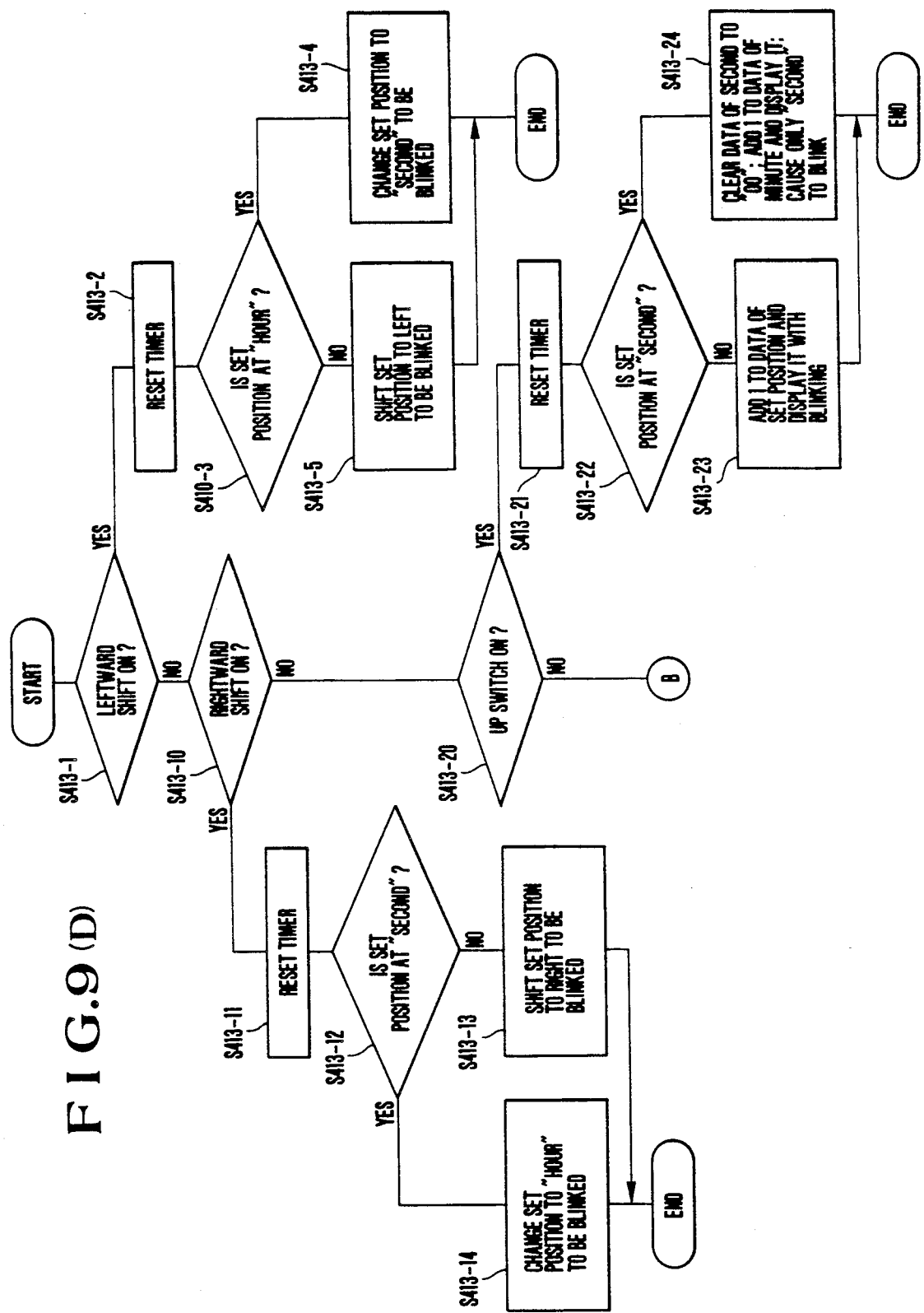
Figure 9:
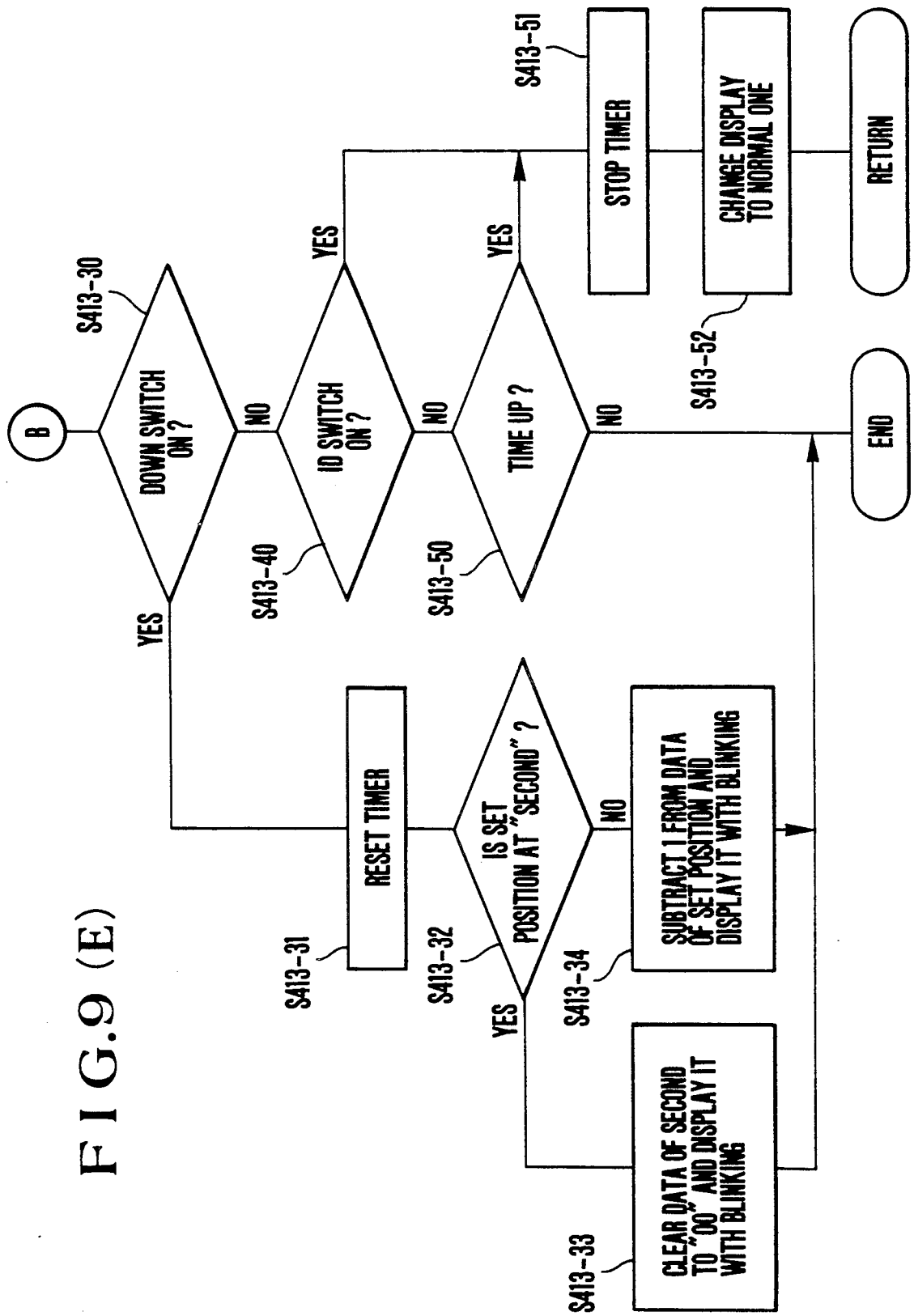
Figure 9F:
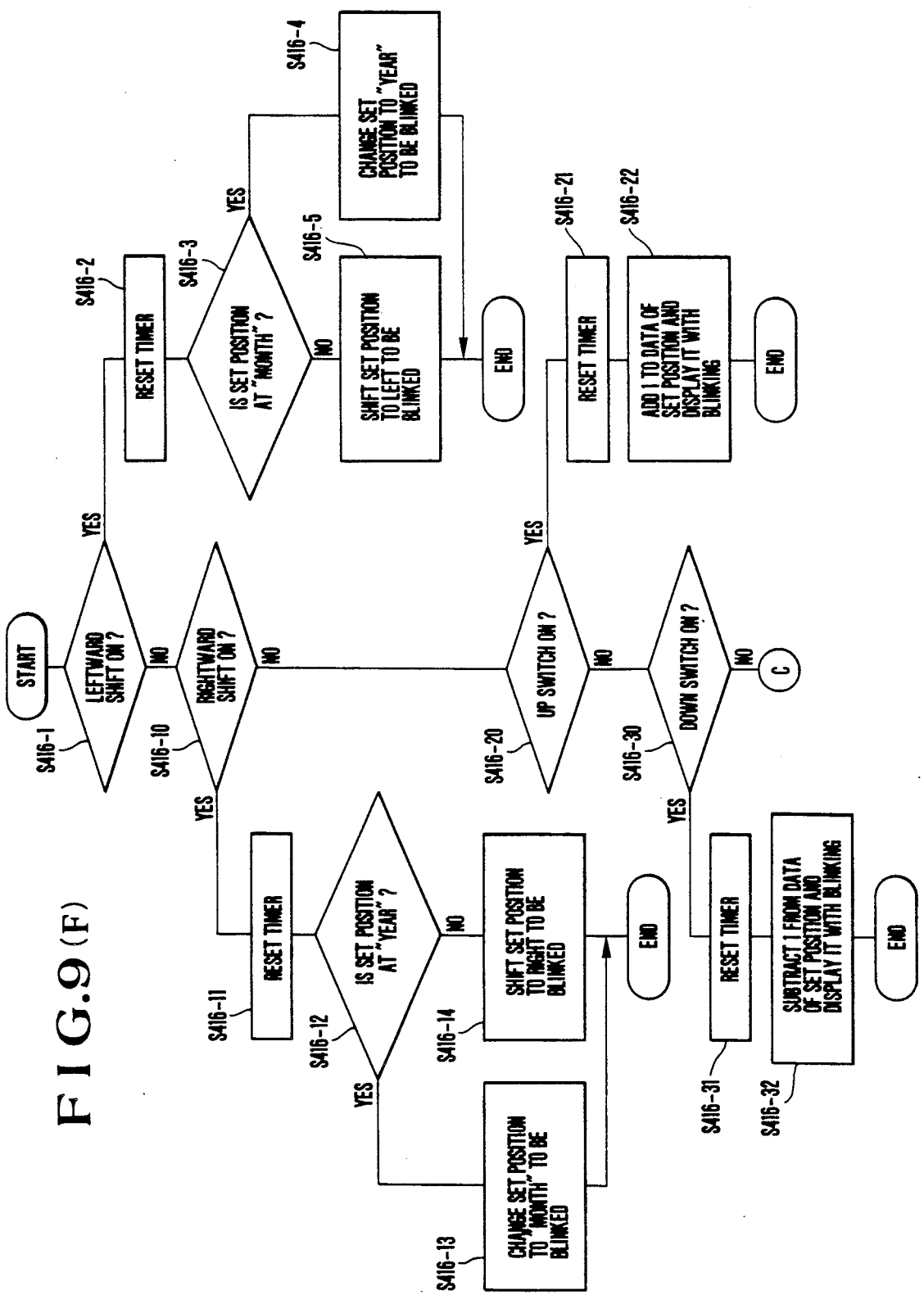
Figure 9:
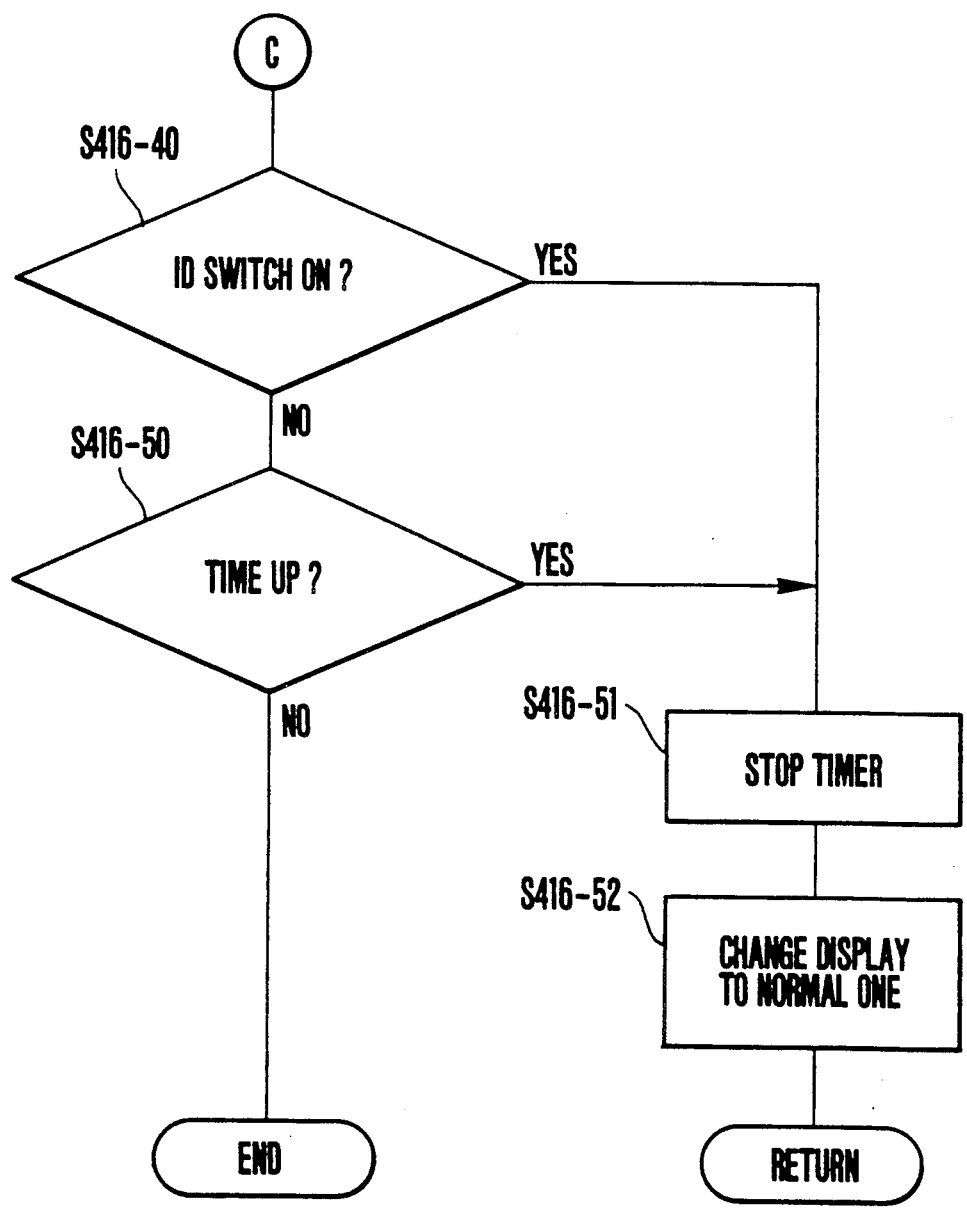

In a step S416, a process for setting a date shown in FIG. 9(F) is carried out. If the setting of the date is not operated, then advance is to a step S417 to test whether or not the T/S switch 11 has been pushed down. If not, then return is to the step S416 and to wait for an input.

When the T/S switch 11 is pushed down, a return to the step S409 occurs so that the mode of setting the total number of exposed frames is operated. Subsequently, each time the T/S switch 11 is pushed down, it is changed over to the time setting mode and therefrom to the date setting mode.

FIG. 9(B) illustrates the process for setting the total number of exposed frames in the step S410 of FIG. 9(A).

In FIG. 9(B), in a step S410-1, whether or not the EXP-comp switch 13 is pushed down is tested. For note, the EXP-comp switch 13 functions not only to set the exposure compensation but also shift to the left the digit position to be set of the total number of exposed frames. If not, then advance is to a step S410-10. When the EXP-comp switch 13 is pushed down, an advance to a step S410-2 occurs. In the step S410-2, the timer which was set in the step S402 is reset.

In a step S410-3, whether or not the digit which is allowed to alter is in the position for the number of thousands, namely, the position of the display segment 101, is tested. If not, then advance is to a step S410-4. If it is the position of the display segment 101, the position in which the digit is allowed to alter is changed to the position of ID INC 107, and the ID INC 107 is caused to blink (step S410-6), terminating the process for setting the total number of exposed frames of the step S410, to wait for the next input.

Here, suppose the ID INC 107 is set in the position for allowing alteration of the figure, then the frame number is automatically counted up one in each exposure.

In a step S410-4, whether or not the position in which the digit is allowed to alter is the position of ID INC 107 is tested. If not, the digit position that is allowed to alter its digit is shifted leftward to the next digit position and the latter is caused to blink, informing the camera user of the possibility of altering the digit (step S410-5).

If the position which is allowable for alteration is the ID INC 107, the digit to be altered is put on the first position, namely, the position of the display segment 104, and this digit is caused to blink (step S410-7), terminating the process for setting the frame number in the step S410, to wait for the next input.

Next, if the EXP-comp switch 13 is determined in the step S410-1 not to be pushed down, whether or not the EXP-comp switch 13 is pushed down is tested in the step S410-10. For note, the EXP-comp switch 13 functions not only to set the exposure compensation but also to shift rightward the digit position to be set of the total number of exposed frame.

If not, then advance is to a step S410-20 of FIG. 9(C). When the EXP-comp switch 13 is pushed down, the timer is reset in a step S410-11.

Next, in a step S410-12, whether or not the digit to be altered is in the first position is tested. If not, then advance to a step S410-14. If the digit to be altered is in the first position, the position in the digit is allowed to alter is changed to the position of ID INC 107 (step S410-13), terminating the process for setting the total number of exposed frames of the step S410.

In the step S410-14, whether or not the digit to be altered is in the position of ID INC 107 is tested. If not, the position in which the digit is allowed to alter is shifted rightward, and the new one is caused to blink (step S410-15). If the digit to be altered is in the position of the ID INC 107, the digit to be altered is moved to the fourth position for the number of thousands, and this position is caused to blink (step S410-16). When the operations of the steps S410-15 and S410-16 terminate, the process of the step S410 comes to an end to wait for the next input.

If, in the step S410-10, the EXP-comp switch 13 is not pushed down, whether or not the UP switch 16 has been pushed down is tested in the step S410-20. If not, then advance is to a step S410-30. If the UP switch 16 is pushed down, then advance is to a step S410-21. In the step S410-21, the timer is reset, and whether or not the next digit to be altered is in the position of ID INC 107 is tested (Step S410-22). If the digit to be altered is in the position of ID INC 107, the ID INC 107 and ON mark 108 are caused to blink (Step 410-23). In this state, the total number of exposed frames is automatically counted up each time an exposure has been made.

If the position in which the digit is allowed to alter is not the ID INC 107, the digit displayed in the position for allowing its alteration is changed to a digit resulting from the addition of 1 to it, and this new digit is caused to blink (Step S410-24).

When the operation of the step S410-23 or the step S410-24 terminates, the process of the step S410 comes to end.

Next, in a step S410-30, whether or not the pushed-down switch is the DOWN switch 15 is tested. If not, then advance to a step S410-40. If the DOWN switch 15 is pushed down, then advance is to a step S410-31. In the step S410-31, the timer is reset. Then advance is to a step S410-32. In the step S410-32, whether or not the position in which the digit is allowed to alter is the position of ID INC 107 is tested. If the position in which the digit is allowed to alter is the position of ID INC 107, then the ID INC 107 and the OFF mark 109 (step S410-33) are caused to blink. In this state, the automatic counting of the total number of exposed frames is not performed when each exposure has been made. When the operation of the step S410-33 or the step S410-34 terminates, the process of the step S410 has an end.

In a step S410-40, whether or not the ID switch 14 has been pushed down for the second time is tested. If not, then advance to a step S410-50. If the ID switch 14 is pushed down for the second time, the timer is stopped in a step S410-41, and the blinking is interrupted in a step S410-42. With the set total number of exposed frames displayed as it is, the control process of this embodiment and the interrupting is released.

In the step S410-50, whether or not the timer has upped is tested. If the timer has upped, for it is taken as the end of setting, then return to the step S410-41. If not, then the process of the step S410 ends to wait for the next input.

FIG. 9(D) illustrates a process for setting a time in the step S413 of FIG. 9(A).

In a step S413-1, whether or not the EXP-comp switch 13 has been pushed down is tested. If not, then advance is to a step S413-10. When the EXP-comp switch 13 has been pushed down, the timer is reset in a step S413-2. Then advance is to a step S413-3. In the step S413-3, whether or not the position in which the digits are allowed to alter is the display segments 101 and 102 representing "hour" is tested. If not, the position in which the digits are allowed to alter is shifted leftward, and the resultant position is blinked (step S413-5). If the position in which the digits are allowed to alter is the "hour" position, then change the position in which the digits are allowed to alter is changed to the display segments 107 and 108 representing "second" and blink the resultant position (step S410-4).

Next, in a step S413-10, whether or not the EXP-comp switch 13 has been pushed down is tested. If not, then advance is to a step S413-20. If the EXP-comp switch 13 is pushed down, then reset the timer is reset in a step S413-11. In a step S413-12, whether or not the position in which the digits are allowed to alter is the "second" position is tested. If not, the position in which the digits are allowed to alter is shifted rightward, and blinking occurs in the resultant position. If the position in which the digits are allowed to alter is the "second" position, then the position in which the digits are allowed to alter to the "hour" position in which blinking occurs (step S413-14). When the operation of the step S413-13 or step S413-14 terminates, the process of step S413 ends.

Next, in a step S413-20, whether or not the UP switch 20 is pushed down is tested. If not, then advance is to a step S413-30. If the UP switch 16 is pushed down, then the timer is reset in a step S413-21. In a step S413-22, whether or not the position in which the digits are allowed to alter is the "second" position is tested.

If not, then the number in the position in which the digits are allowed to alter to a higher number by 1, and this number in the display is caused to blink (step S413-23). Otherwise, in the position in which the digits are allowed to alter, the display of "second" as read out from the "second" data becomes "00" with their blinking (step S413-24). When the step S413-23 or the step S413-24 terminates, the process of the step S413 ends.

In a step S413-30 of FIG. 9(E), whether or not the DOWN switch 15 has been pushed down is tested. If not, then advance is to a step S413-40. If the DOWN switch 15 is pushed down, then the timer is reset in a step S413-31. In a step S413-32, whether or not the position in which the digits are allowed to alter is the "second" position is tested. If it is the "second" position, then clear the display of the "second" to "00" and display it with blinking (step S413-33). If not, then change the number in the position in which the digits are allowed to alter to a lower number by 1 and display it with blinking (step S413-34). When the step S413-33 or the step S413-34 terminates, the process of the step S413 has an end.

Next, in a step S413-40, whether or not the ID switch 14 has been pushed down for the second time is tested. If not, then advance to a step S413-50. If the ID switch 14 is pushed down for the second time, then stop the timer in a step S413-51, and interrupt the blinking in the set state of the display, ending the control process of this embodiment. In the step S413-50, whether or not the timer is timed up is tested. If the time is up, then advance to a step S413-51. If not, then end the process of the step S413.

FIG. 9(F) illustrates a process for setting a date in the step S416.

In a step S416-1, whether or not the EXP-comp switch 13 has been pushed down is tested. If not, then advance to a step S416-10. If the EXP-comp switch 13 is pushed down, then reset the timer in a step S416-2. In a step S416-3, whether or not the position in which the digits are allowed to alter is "month", namely, the position of the display segments 101 and 102, is tested. If it is the "month" position, then change the position in which the digits are allowed to alter is changed to "year", and this display is caused to blink (step S416-4). If not, then a shift leftward is made for the position in which the digits are allowed to alter, and the resultant position is caused to blink (step S416-5). When the operation of the step S416-4 or the step S416-5 has terminated, the process of the step S416 ends.

Next, in a step S416-10, whether or not the EXP-comp switch 13 has been pushed down is tested. If not, then advance is to a step S416-20. If the EXP-comp switch 13 is pushed down, then the timer is reset in a step S416-11. In a step S416-12, whether or not the position in which the digits are allowed to alter is the position of "year" is tested. If the position in which the digits are allowed to alter is the position of "year", then the position in which the digits are allowed to alter is changed to the position of "month" and its display is caused to blink (step S416-13). If not, then a shift rightward is made for the position in which the digits are allowed to alter and the display of the resultant position is caused to blink (step S416-14). When the step S416-13 or the step S416-14 has terminated, the process of the step S416 ends.

Next, in a step S416-20, whether or not the UP switch 16 has been pushed down is tested. If not, then advance is to a step S416-30. If the UP switch 16 is pushed down, then the timer is reset in a step S416-21. Then the number in the position in which the digits are allowed to alter is changed to a higher number by 1, and its display is caused to blink (step S416-22). Thus, the process of the step S416 ends.

In a step S416-30, whether or not the DOWN switch 15 has been pushed down is tested. If not, then advance is to a step S416-40. If the DOWN switch 15 is pushed down, then the timer is reset in a step S416-31. In a step S416-32, the number in the position in which the digits are allowed to alter is changed to a lower number by 1, and the display of the resultant number is blinked. Thus, the process of the step S416 ends.

In a step S416-40 of FIG. 9(G), whether or not the ID switch 14 has been pushed down is tested. If the ID switch 14 is pushed down, then advance is to a step S416-51. If not, then advance is to a step S416-50. In the step S416-50, whether or not the timer has timed out is tested. If not, then an to the process of the step S416 is ended. If yes, then advance to a step S416-51 to stop the timer. The set number is displayed without further alteration, and the blinking is interrupted. Thus, the control process of this embodiment ends.

In connection with the foregoing description of the control process of the embodiment of the invention, the above-described positions in which the digit or digits is or are allowed to alter may have their storage in, for example, a position register for the allow-to-display position information provided in the RAM 3. Also, the blinking display of the display segments is possible when the display signal is sent from the CPU 1 to the LCD driver 4 in each prescribed time.

Further, the set ID information is stored in the RAM 3 in order to perform the process for altering the time and the total number of exposed frames.

Figure 10:
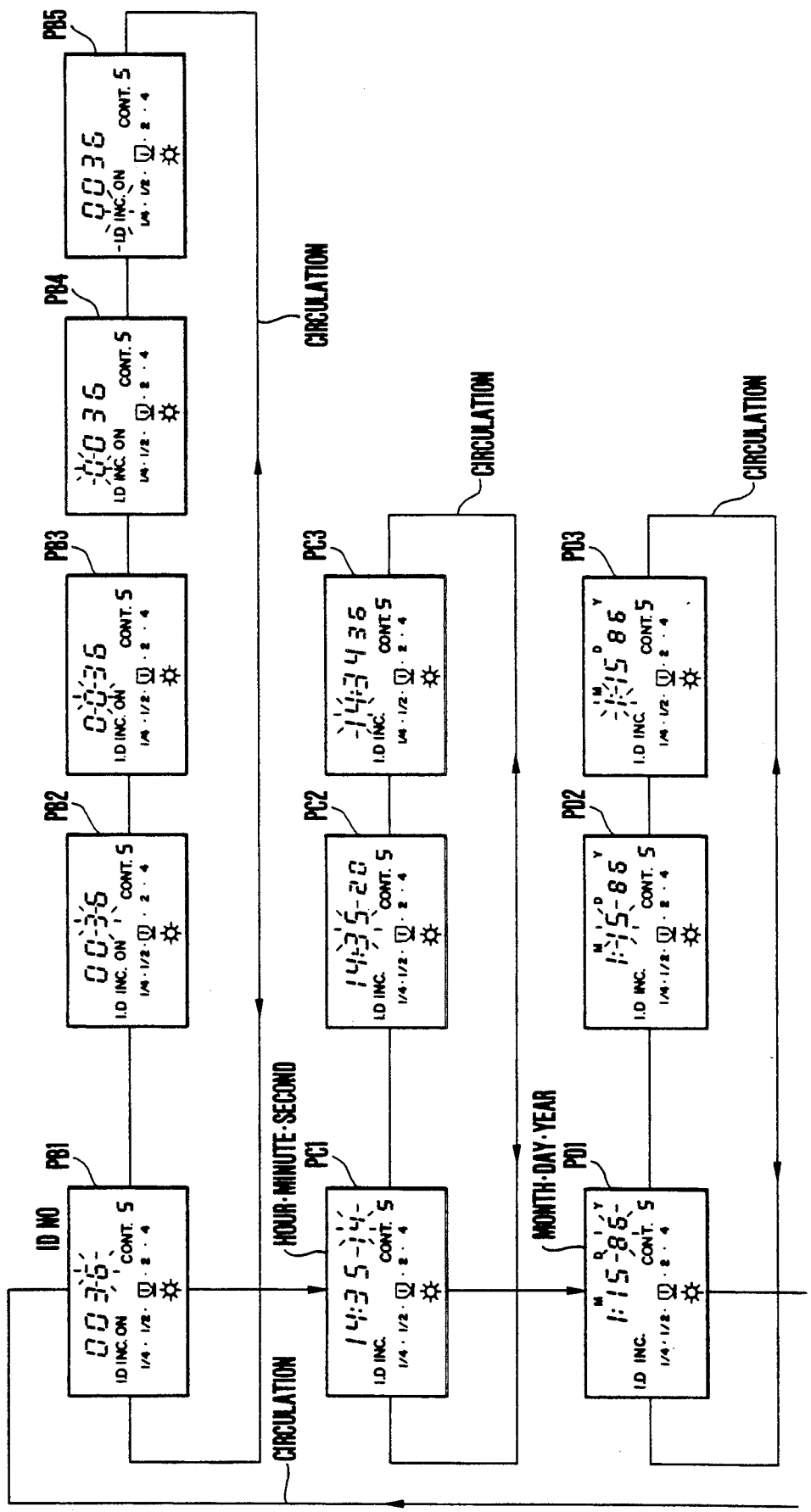
FIG. 10 are sequences of plan views of different ID displays in the embodiment of the invention.

Next, the sequence of the operations with recurrence of displays of the embodiment of the invention is described. FIG. 10 illustrates an example of the recurrence of the embodiment of the invention.

When the ID switch 14 is pushed down, the display of the time is changed to a display of the total number of exposed frames and the display segments 101-104 blink, informing the camera user that setting of an ID information has become possible. Then, when the T/S switch 11 is pushed down, the display segment 104 of "6" blinks as shown in a format PB1 of FIG. 10, informing that this digit is allowed to alter. When the EXP-comp switch 13 is once pushed down, the display segment 103 of "3" then blinks as shown in a display format PB2, informing that this digit is allowed to alter. At this time, when the UP switch 16 is once pushed down, the display of "3" changes to "4". Further, each time the UP switch is pushed down, it changes successively in the up order. Also, each time the EXP-comp switch 13 is pushed down, the blinking position shifts up to a display format PB5. If the UP switch 16 is pushed down under the condition that the ID INC 107 is blinking as shown in the format PB5, the ON mark 108 is displayed, indicating that the total number of exposed frames will be automatically renewed. Also, if the DOWN switch 15 is pushed down, the OFF mark 109 is displayed, indicating that the automatic renewing is not carried out.

As the setting of the total number of exposed frames has ended, when the ID switch 14 is pushed down, the display segments 101-104 return to the usual display of the time. When the T/S switch 11 is pushed down in the stage of displaying the total number of exposed frames, the display segments 101-106 change to a display of the hour, minute and second, and the display of the second blinks as shown in a display format PC1, informing that this position is allowed to alter its display. When the EXP-comp switch 13 is pushed down, the position of the minute blinks as in a display PC2. When the EXP-comp switch 13 is pushed down, a return to the display PC1 occurs. Each time the UP switch 16 or the DOWN switch 115 is pushed down in the desired setting position, the number changes in the up or down order respectively.

When, in this state, the ID switch 14 is pushed down, that display returns to the usual display as has been described above. When the T/S switch 11 is pushed down, the display segments 101-106 change over to a display of the month, day and year. Setting of a month, a date and a year is similar to that described in connection with the hour, minute and second. When, in this state, the ID switch 14 is pushed down, that display returns to the usual display. When the ID switch 14 is pushed down, that display returns to the display of the total number of exposed frames.

In such a manner, the total number of exposed frames, the time in hour, minute and second, and the date in month, day and year can be selectively set.

For note, though this embodiment has been described in connection with an example of variation of the display in three stages for the total number of exposed frames, the time and the date, it goes without saying that an additional kind of information can be displayed by using the same input means provided that it represents numerical data of a photographic factor.

For note, though, in this embodiment, the shutter speed is exemplified as computed from the light value information, it is needless to say that the shutter speed may be set manually.

As has been described above, according to this embodiment, many informations can be displayed by a few display means. This produces an advantage that the size of the camera can be reduced, and many other digit informations can be even displayed.

Also, as has been described by using FIG. 6, according to this embodiment, a great number of white balance modes can be set easily. This produces another advantage that the required number of push buttons is not as many as the number of white balance modes to be set so that the limited space of the camera permits the provision of many other setting switches than those for the white balance.

Figure 3:
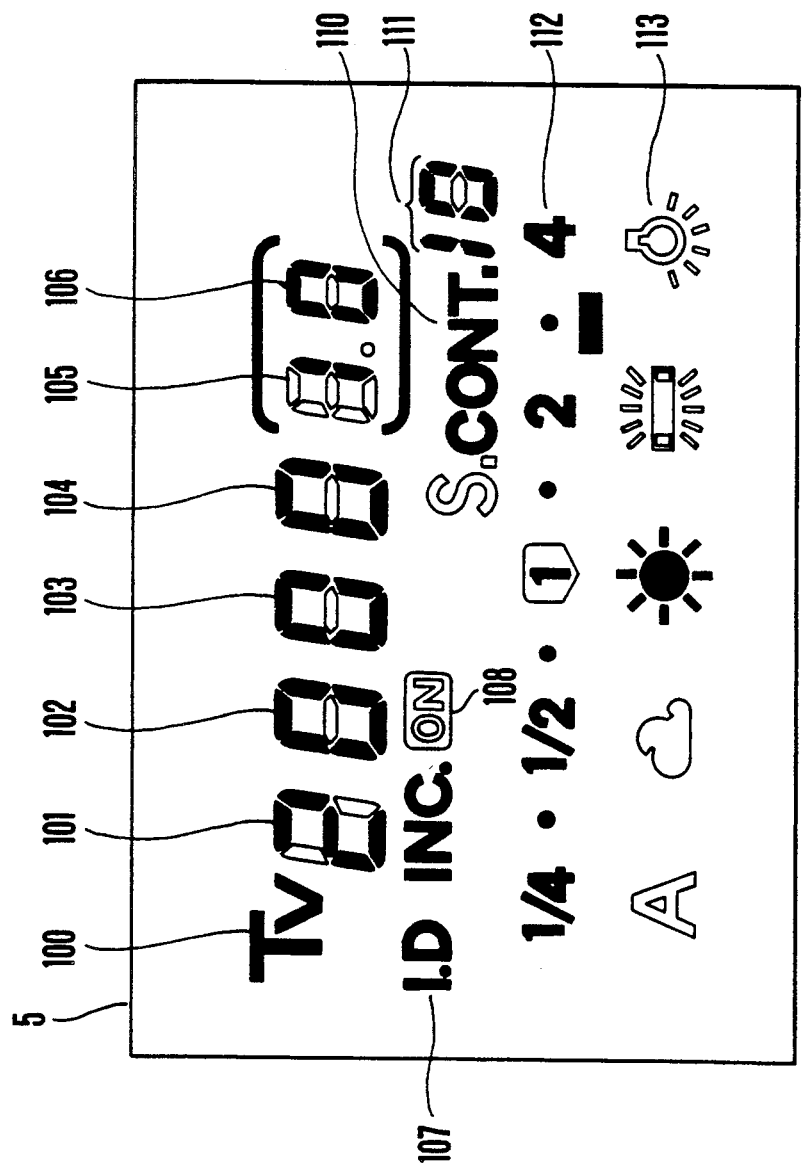

In the display device of the above-described embodiment, in addition to the informations such as the film frame number, the F value and the shutter speed (Tv), the time, date, white balance, and other numerical data (ID) are displayed. Here, what is unnecessary to always display, for example, the time, date, ID and Tv is made to use the common display segments. By using such segments, for example, the liquid crystal display device having the plurality of segments as shown by 100-106 in FIG. 3, it is possible to display the time (hour, minute, second), the date (month, day, year), ID and Tv shown in FIG. 3(B).

Figures 11, 12B, 12C, 12E, 12F:
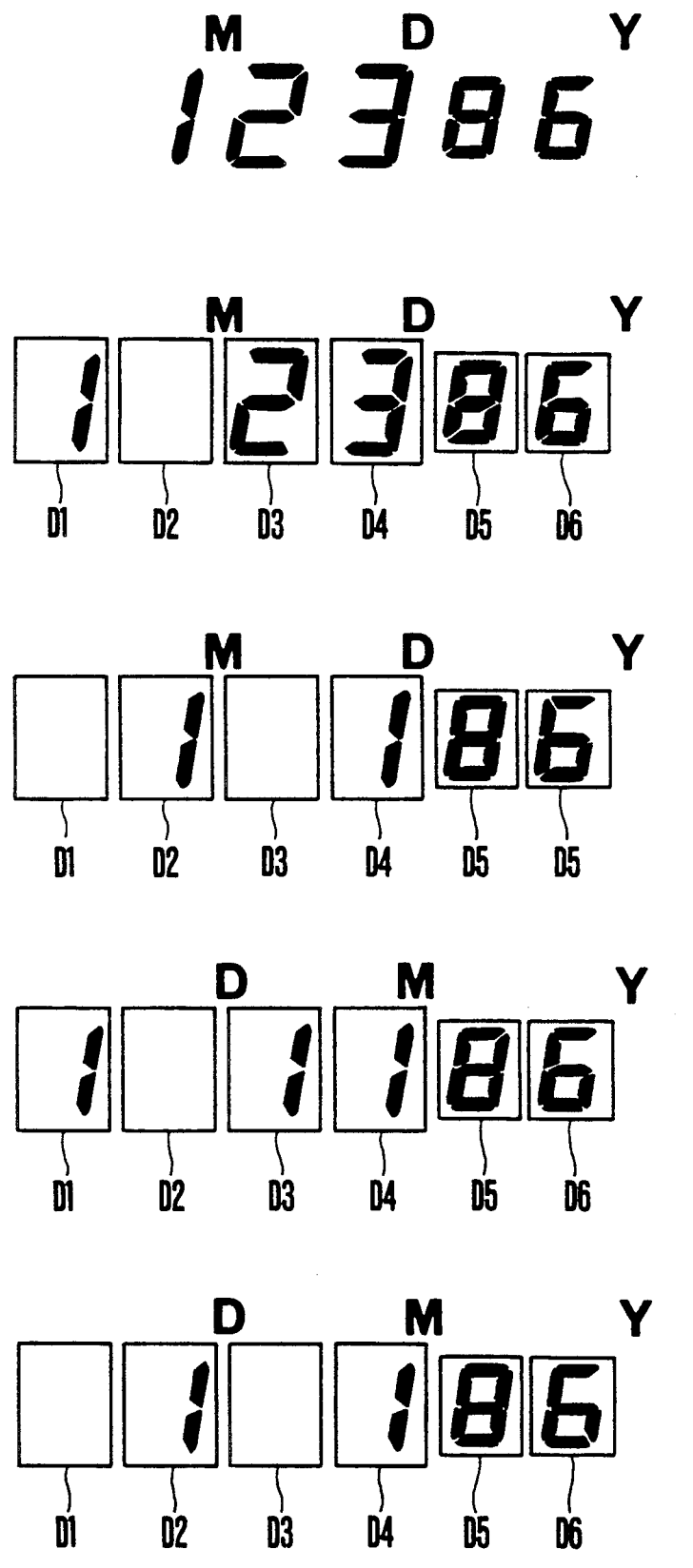

In such a display device, however, the left four 7-segments 101-104 for the ID and Tv must be evenly spaced from each other. Therefore, there is a possibility of misreading the other displays. For this reason, as to the time when to display, a colon (:) is used to intervene between the hour and the minute. But, in the case of the date when to display, there was a problem that as shown in FIG. 11, Jan. 23rd '86 was mistaken for Dec. 3rd '86.

Another multi-functional display device which has eliminated such a problem and is made easier to read is next described.

In such an embodiment, the structure of the device is described with exclusion of the similar parts to those of the embodiment shown in FIG. 1 but only in respect to different parts therefrom.

Figure 12:
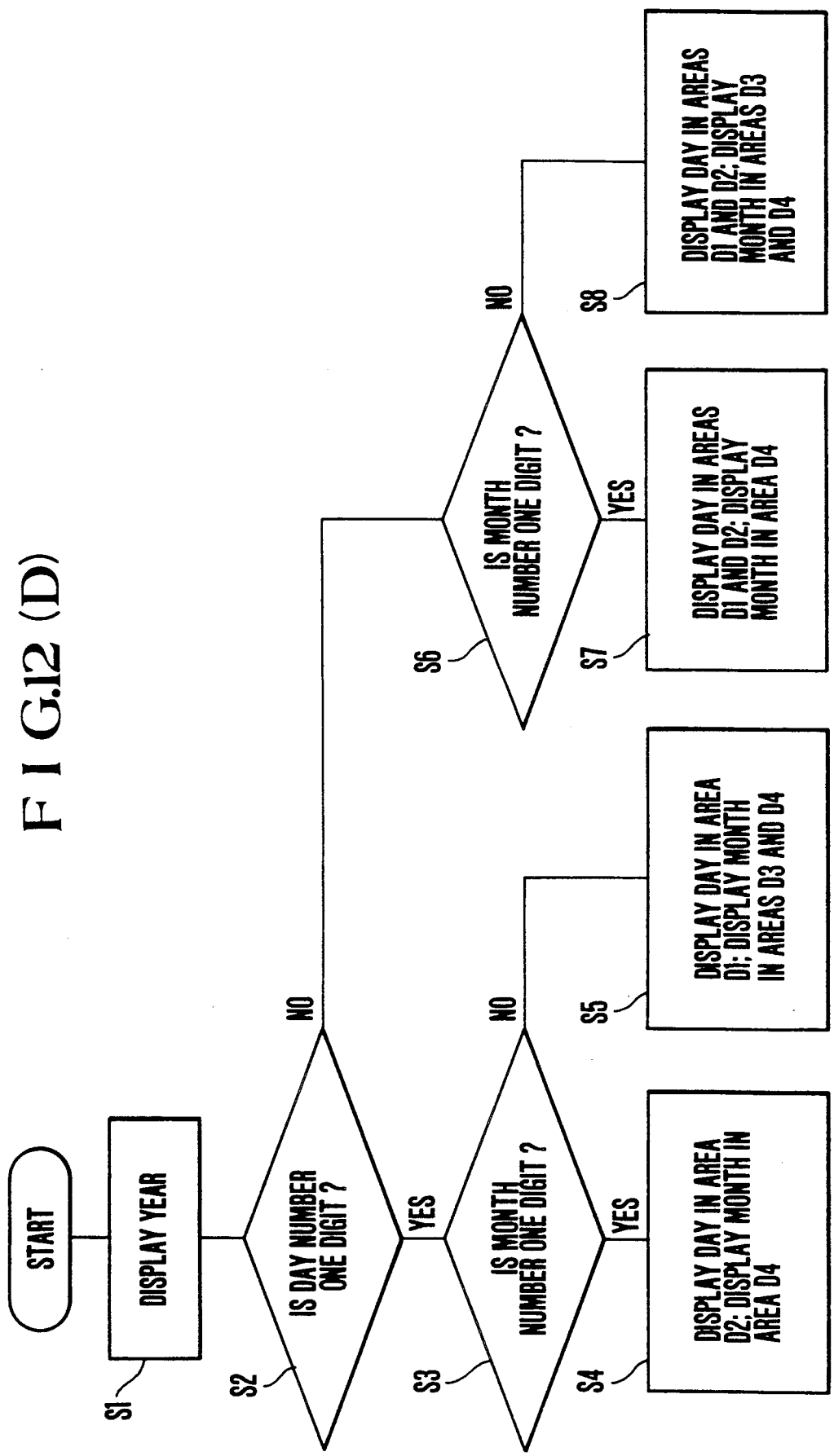
FIG. 12(A) is a flowchart illustrating an example of a program for control in a second embodiment of the invention.
FIG. 12(B) and 12(C) are diagrams illustrating an example of a display in the second embodiment of the invention.
FIG. 12(D) is a flowchart illustrating the second example of the program for control in the second embodiment of the invention.
FIGS. 12(E) and 12(F) are diagrams illustrating a second example of the display in the second embodiment of the invention.

FIG. 12(A) illustrates an example of the control process in such embodiment.

In FIG. 12(A), when the date display mode is selected by the selection switch 14, the CPU 1 reads out the date information or the information of year, month and day, from the RAM 3. In a step S1, a display of year is presented to display areas D5 and D6 as shown in FIG. 12(B).

In a step S2, whether or not the readout month information is one digit is tested. If not, then advance to a step S6. If the readout month is one digit, then whether or not the readout day information is one digit is tested in a step S3.

If the day information is one digit, then display is in a way shown in FIG. 12(C) with the month information in a display area D2 of the display device 5 and the day information in a display area D4 (step S4). If the day information is not one digit, then display is in such a different way as shown in FIG. 12(B) with the month information in a display area D1 and the day information in the display areas D3 and D4 (step S5).

In a step S6, whether or not the readout day information is one digit is tested. If the day information is one digit, the month information is displayed in the areas D1 and D2, and the day information is displayed in the area D4 (step S7).

If the day information is not one digit, the month information is displayed to the areas D1 and D2, and the day information in the areas D3 and D4 (step S8).

Subsequently, each time the display of year, month, day is recycled, this control process is performed thereby it being made possible to carry out a comfortable display of the year, month and day.

FIG. 12(D) illustrates a second control process in this embodiment.

In FIG. 12(D), when the date display mode is set by the selection switch 14, the CPU 1 reads out the date information or the information of year, month and day from the RAM 3. In a step S1, the year is displayed in the areas D5 and D6 as shown in FIG. 12(F).

In a step S2, whether or not the readout day information is one digit is tested. If not, then advance is to a step S6. If the readout day is one digit, whether or not the readout month information is one digit is tested in a step S3.

If the number of digits of the day information is one, then display is in a way as shown in FIG. 12(F) with the day information in the area D2 of the display device 5 and the month information in the area D4 (step S4). If the month information is not one digit, then display is in another way as shown in FIG. 12(E) with the day information in the area D1 and the month information in the areas D3 and D4 (step S5).

In a step S6, whether or not the readout month information is one digit is tested. If the month information is one digit, the day information is displayed in the areas D1 and D2 and the month information in the area D4 (step S7).

If the month information is not one digit, the day information is displayed in the areas D1 and D2 and the month information to the areas D3 and D4 (step S8).

Subsequently, each time the display of year, month, day is recycled, this control process is carried out, thereby it being made possible to present a comfortable display of year, month and day.

According to this embodiment, the ones of the displays which are liable to be misread in the preceding embodiment can be modified in the display position, thereby giving an advantage that the display in the limited space as in the camera becomes easier to read.

What is claimed is:

1. An adjusting device comprising:

(a) first means for indicating alteration of the set mode of white balance;
    (b) second means for altering modes of said white balance to be set in a prescribed order when an alteration of the set mode of white balance is indicated by said first means;
    (c) a display element for displaying a plurality of white balance modes, said element having character display portion and picture display portion being activated selectively in said picture display portion being activated selectively in accordance with driving signals; and
    (d) a driver for producing the driving signals, based on said white balance mode altered by said second means.

2. A device according to claim 1, wherein when an alteration of the set mode of not white balance is being indicated by said first means, said second means is means for altering other modes to be set other than said white balance in a prescribed order.

3. A device according to claim 1, further comprising:
    third means for indicating an alteration of exposure compensation modes, and wherein said second means alters said exposure compensation modes in a prescribed order when an alteration of the exposure compensation modes is being indicated by said third means.

4. A device according to claim 1, further comprising:
    third means for indicating an alteration of the number of shots per unit time, and wherein said second means alters said number of shots in a prescribed order when an alteration of the number of shots is being indicated by said third means.

5. An adjusting device for selecting a desired white balance mode from a plurality of white balance modes, comprising:

(a) first means for indicating alteration of the set mode of white balance;
    (b) a display element for displaying a plurality of white balance modes, said element having character display portion and picture display portion and said character display portion and said picture display portion being activated selectively in accordance with display driving signals;
    (c) second means for altering modes of said white balance set in a prescribed order when an alteration of set mode of white balance is indicated by said first means;
    (d) means for producing white balance value signals indicating white balance modes set by said second means; and
    (e) a display element driver for producing said display driving signals, said driver being arranged to drive said display element to cause the mode of white balance set by second means to be visible, depending upon said white balance value signal.

6. A device according to claim 5, wherein when an alteration of the set mode of not white balance is being indicated by said first means, said second means is means for altering other modes to be set than said white balance in a prescribed order.

7. A device according to claim 5, further comprising:
    third means for indicating an alteration of exposure compensation modes, and wherein said second means alters said exposure compensation modes in a prescribed order when an alteration of the exposure compensation modes is being indicated by said third means.

8. A device according to claim 5, further comprising: third means for indicating an alteration of the number of shots per unit time, and wherein said second means alters said number of shots in a prescribed order when an alteration of the number of shots is being indicated by said third means.

9. A device according to claim 5, wherein said display element is a LCD.

10. A device according to claim 9, wherein there are a plurality of said pictures, depending upon said white balance modes, and they are displayed on different positions of said LCD.

11. A device according to claim 5, wherein said second means includes a first switch arranged to alternate said modes of white balance on a first order and a second switch arranged to alternate said modes of white balance on a second order which is different from said first order.

12. A device according to claim 5, wherein said mode of white balance includes an automatic adjusting mode of white balance.

13. A device according to claim 5, wherein said driver is arranged to drive said display element to cause the white balance mode set by said second means to be visible, by producing the display driving signal which causes said display element to provide no display of the pictures which do not correspond to the mode of white balance set by said second means.

14. An adjusting device for selecting a desired white balance mode from a plurality of white balance modes, comprising:
(a) means for altering modes of said white balance to set in a prescribed order;
(b) means for producing white balance value signal syndicating white balance mode set by said altering means;
(c) a display element for displaying a plurality of white balance modes, said element having character display portion and said picture display portion being activated selectively in accordance with display driving signals;
(d) driving signal producing means for producing display driving signals for displaying a picture or letter corresponding to said white balance value among a letter and plurality of pictures which can be displayed on said display element; and
(e) means for indicating alterability of the set mode of white balance.

15. A device according to claim 14, wherein when an alteration of the set mode of not white balance is being indicated by said indicating means, said altering means is means for altering other modes to be set than said white balance in a prescribed order.

16. A device according to claim 41, further comprising:
means for indicating alterability of exposure compensation modes, and wherein said altering means alters said exposure compensation modes in a prescribed order when alterability of the exposure compensation modes is being indicated by said means for indicating alterability of exposure compensation modes.

17. A device according to claim 14 further comprising:
means for indicating an alteration of the number of shots per unit time, and wherein said altering means alters said number of shots in a prescribed order when an alteration of the number of shots is being indicated by said means for indicating an alteration of the number of shots per unit time.

18. A device according to claim 14, wherein said display element is a LCD.

19. A device according to claim 18, wherein there are a plurality of said pictures, depending upon said white balance modes, and they are displayed on different positions of said LCD.

20. A device according to claim 14, wherein the white balance altering means includes a first switch arranged to alternate said modes of white balance on a first order and a second switch arranged to alternate said modes of white balance on a second order which is different from said first order.

21. A device according to claim 14, wherein said mode of white balance includes an automatic adjusting mode of white balance.

22. A device according to claim 1, wherein said display element is a LCD.

23. A device according to claim 22, wherein there are a plurality of said pictures, depending upon said white balance modes, and they are displayed on different positions of said LCD.

24. An apparatus comprising:
means for indicating alterability of set mode of white balance;
an operable switch for altering white balance mode in a prescribed order;
means for producing white balance value signals indicating white balance mode altered by said operable switch;
display element for displaying a plurality of white balance modes, said element having character display portion and picture display portion, which can be selectively activated in accordance with driving signals; and
means for producing the driving signals based on said white balance mode altered by said operable switch, when said alterability is indicated by said indicating means.

25. An apparatus according to claim 24, further comprising: means for causing said operable switch to operate.

26. An apparatus according to claim 25, wherein when said causing means operates said operable switch, said operable switch alters the white balance mode in said prescribed order each time when said operable switch is operated.

27. An apparatus comprising:
means for indicating alterability of set mode of white balance;
an operable switch for altering white balance mode in a prescribed order;
means for producing white balance value signals indicating white balance mode altered by said operable switch;
a display element for displaying a plurality of white balance modes, said element having character display portion and picture display portion, which can be selectively activated in accordance with driving signals;
means for producing the driving signals based on said white balance mode altered by said operable switch, when said alterability is indicated by said indicating means; and
means for indicating alterability of the number of shots per unit time, wherein said operable switch alters the number of shots in a prescribed order when alterability of the number of shots is being indicated by said display element.

28. An apparatus according to claim 24, wherein said display element is an LCD.

29. An apparatus according to claim 28, wherein there are a plurality of pictures for display, depending upon said white balance modes, and said pictures are displayed on different positions of said LCD.

30. An apparatus according to claim 24, wherein said mode of white balance includes an automatic adjusting mode of white balance.

31. An apparatus according to claim 24, further comprising:
means for causing said operable switch to operate.

32. An apparatus according to claim 24, wherein said display element is an LCD.

33. An apparatus according to claim 24, wherein said modes of white balance includes an automatic adjusting mode of white balance.

34. An adjusting device for selecting a desired white balance mode from a plurality of white balance modes, comprising:
(a) means for altering modes of said white balance to set in a prescribed order;
(b) means for producing white balance value signals indicating white balance mode set by said altering means;
(c) a display element for displaying a plurality of white balance modes, said element having character display portion and picture display portion and said character display portion and said picture display portion being activated selectively in accordance with display driving signals;
(d) driving signal producing means for producing display driving signals for displaying a picture or letter corresponding to said white balance value among a letter and plurality of pictures which can be displayed on said display element;
(e) means for indicating alterability of exposure compensation modes, and wherein said altering means alters said exposure compensation modes in a prescribed order when alterability of the exposure compensation modes is being indicated by said means for indicating alterability of exposure compensation modes; and
(f) means for indicating alterability of the set mode of white balance.

35. A device according to claim 34 further comprising:
means for indicating alterability of the number of shots per unit time, and wherein said altering means alters said number of shots in a prescribed order when alterability of the number of shots is being indicated by said means for indicating alterability of the number of shots per unit time.

36. A device according to claim 34, wherein said display element is a LCD.

37. A device according to claim 34, wherein the white balance altering means includes a first switch arranged to alternate said modes of white balance on a first order and a second switch arranged to alternate said modes of white balance on a second order which is different from said first order.

38. A device according to claim 34, wherein said mode of white balance includes an automatic adjusting mode of white balance.

39. An adjusting device for selecting a desired white balance mode from a plurality of white balance modes, comprising:
(a) means for altering modes of said white balance to set in a prescribed order;
(b) means for producing white balance value signals indicating white balance mode set by said altering means;
(c) a display element for displaying a plurality of white balance modes, said element having character display portion and picture display portion and said character display portion and said picture display portion being activated selectively in accordance with display driving signals;
(d) driving signal producing means for producing display driving signals for displaying a picture or letter corresponding to said white balance value among a letter and plurality of pictures which can be displayed on said display element;
(e) means for indicating alterability of the number of shots per unit time, and wherein said altering means alters said number of shots in a prescribed order when alterability of the number of shots is being indicated by said means for indicating alterability of the number of shots per unit time; and
(f) means for indicating alterability of the set mode of white balance.

40. A device according to claim 39 further comprising:
means for indicating alterability of exposure compensation modes, and wherein said altering means alters said exposure compensation modes in a prescribed order when alterability of the exposure compensation modes is being indicated by said means for indicating alterability of exposure compensation modes.

41. A device according to claim 39, wherein said display element is a LCD.

42. A device according to claim 39, wherein the white balance altering means includes a first switch arranged to alternate said modes of white balance on a first order and a second switch arranged to alternate said modes of white balance on a second order which is different from said first order.

43. A device according to claim 39, wherein said mode of white balance includes an automatic adjusting mode of white balance.

* * * * *

UNITED STATES PATENT AND TRADEMARK OFFICE
CERTIFICATE OF CORRECTION

PATENT NO. : 5,130,742
DATED : July 14, 1992
INVENTOR(S) : Ryosuke Miyamoto and Shinji Sakai It is certified that error appears in the above-identified patent and that said Letters Patent is hereby corrected as shown below:

Col. 3, line 41,   Change "are" to -- shows --
Col. 4, line 41,   Change "beset" to -- be set --
Col. 6, lines 8 and 12, After "advance" insert -- is--.
Col. 7, line 10,   Change "z637 A"" to -- "A" --
Col. 7, line 59,   Delete "reset"
Col. 8, line 30,   After "13" insert -- is --
Col. 9, line 23,   Delete "L1"
Col. 10, line 8,   Delete ","
Col. 10, line 59,  After "advance" insert -- is --
Col. 11, line 3,   Delete "has an" and change "end" to -- ends --
Col. 11, line 6,   After "advance" insert -- is --
Col. 11, line 11,  After "embodiment" insert -- ends --
Col. 11, line 13,  Change "upped" to -- timed out --
Col. 11, line 30,  Delete "change"
Col. 11, line 37,  Delete "reset"
Col. 11, lines 45, 56. After "alter" insert -- is changed --
Col. 12, line 8,   Change "has an end." to -- ends. --
Col. 12, line 29,  Delete "change"
Col. 13, line 6,   Delete "then an to"
Col. 13, line 63,  Change "115" to -- 15 --
Col. 15, line 5,   After "advance" insert -- is --
Col. 15, line 57,  Change "to" to -- is --

UNITED STATES PATENT AND TRADEMARK OFFICE
CERTIFICATE OF CORRECTION

PATENT NO. : 5,130,742
DATED : July 14, 1992
INVENTOR(S) : Ryosuke Miyamoto and Shinji Sakai It is certified that error appears in the above-identified patent and that said Letters Patent is hereby corrected as shown below:

Col. 16, line 10, After "portion" insert -- and said character display portion and said picture display portion --

Col. 17, line 8, Change "a" to -- an --

Col. 17, line 34, Change "signal" to -- signals --

Col. 17, line 35, Change "syndicating" to -- indicating --

Col. 17, line 39, Delete "said"

Col. 17, line 39, After "portion" insert -- and said character display portion and said picture display portion --

Col. 19, line 57, Change "a" to -- an --

Col. 20, line 47, Change "a" to -- an --

Signed and Sealed this

Ninth Day of November, 1993

BRUCE LEHMAN

Attest:

Attesting Officer

Commissioner of Patents and Trademarks